(12) United States Patent
Kamaraj et al.

(10) Patent No.: US 8,943,697 B2
(45) Date of Patent: *Feb. 3, 2015

(54) STACKED NOODLE FOR HIGH CAPACITY PULL-OFF FOR A COMPOSITE STRINGER

(75) Inventors: Malmurugan Kamaraj, Kent, WA (US); Donald Paul Matheson, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/350,710

(22) PCT Filed: Jan. 26, 2012

(86) PCT No.: PCT/US2012/022796
§ 371 (c)(1),
(2), (4) Date: Apr. 9, 2014

(87) PCT Pub. No.: WO2012/158217
PCT Pub. Date: Nov. 22, 2012

(65) Prior Publication Data
US 2014/0248462 A1    Sep. 4, 2014

Related U.S. Application Data

(63) Continuation of application No. 13/111,375, filed on May 19, 2011, now Pat. No. 8,776,375.

(51) Int. Cl.
*B21D 53/88*    (2006.01)
*B64C 1/00*    (2006.01)
(Continued)

(52) U.S. Cl.
CPC . *B64C 1/00* (2013.01); *B29C 70/34* (2013.01); *B29L 2031/008* (2013.01); *B29L 2031/30823* (2013.01)

USPC ............. 29/897.2; 29/897; 428/119; 428/193

(58) Field of Classification Search
USPC .......................... 29/897.2, 897; 428/119, 193
See application file for complete search history.

(56) References Cited

U.S. PATENT DOCUMENTS 4,331,723 A    5/1982    Hamm
5,026,595 A    6/1991    Crawford, Jr. et al.
(Continued)

FOREIGN PATENT DOCUMENTS

WO    WO0162495 A2    8/2001
WO    WO2009140555 A2    11/2009
(Continued)

OTHER PUBLICATIONS

PCT search report dated May 19, 2011, regarding application PCT/US2012/022796, international filing date Jan. 26, 2012, applicant's reference 11-1397-PCT, applicant The Boeing Company, 6 pages.
(Continued)

*Primary Examiner* — Richard Chang
(74) *Attorney, Agent, or Firm* — Yee & Associates, P.C.

(57) ABSTRACT

An apparatus comprising a composite elongate member, a channel, and a number of composite structures. The composite elongate member has a side configured for attachment to a surface of a structure. The channel is on the side and extends along a length of the composite elongate member. The number of composite structures is configured for placement in the channel and configured to attach a portion of the side of the composite elongate member to the structure. A composite structure in the number of composite structures comprises layers having different orientations selected to increase a capacity of the composite elongate member to withstand forces that pull the composite elongate member away from the structure.

20 Claims, 25 Drawing Sheets

(51) Int. Cl.
*B29C 70/34* (2006.01)
*B29L 31/00* (2006.01)

(56) References Cited

U.S. PATENT DOCUMENTS

| | | | |
|---|---|---|---|
| 5,639,535 | A | 6/1997 | McCarville |
| 5,789,061 | A | 8/1998 | Campbell et al. |
| 5,827,383 | A | 10/1998 | Campbell et al. |
| 6,562,436 | B2 | 5/2003 | George et al. |
| 6,689,448 | B2 | 2/2004 | George et al. |
| 6,709,538 | B2 * | 3/2004 | George et al. ............ 156/73.3 |
| 2012/0291285 | A1 | 11/2012 | Kamaraj et al. |
| 2012/0292446 | A1 | 11/2012 | Kamaraj et al. |

FOREIGN PATENT DOCUMENTS

| | | |
|---|---|---|
| WO | WO2012158217 A1 | 11/2012 |
| WO | WO2012158301 A1 | 11/2012 |

OTHER PUBLICATIONS

Kamaraj et al., "Vertical Laminate Noodle for High Capacity Pull-Off for a Composite Stringer," U.S. Appl. No. 13/206,946, filed Aug. 10, 2011, 81 pages.

PCT search report dated Jul. 30, 2012, regarding application PCT/US2012/034257, applicant's reference 11-0193-PCT, applicant The Boeing Company, 13 Pages.

Non-final office action dated Oct. 10, 2013 regarding U.S. Appl. No. 13/111,375, 13 pages.

Notice of Allowance, dated Feb. 28, 2014, regarding U.S. Appl. No. 13/111,375, 13 pages.

Office Action, dated Dec. 19, 2013, regarding U.S. Appl. No. 13/206,946, 20 pages.

Notice of Allowance, dated Feb. 19, 2014, regarding U.S Appl. No. 1/206,946, 5 pages.

* cited by examiner

FIG. 7

| COMPOSITE LAYER | MATERIAL | ANGLE | THICKNESS |
|---|---|---|---|
| 1 | BMS8-276 TAPE | 0 | 0.0075 |
| 2 | BMS8-276 TAPE | 0 | 0.0075 |
| 3 | BMS8-276 TAPE | -45 | 0.0075 |
| 4 | BMS8-276 TAPE | 90 | 0.0075 |
| 5 | BMS8-276 TAPE | 90 | 0.0075 |
| 6 | BMS8-276 TAPE | 45 | 0.0075 |
| 7 | BMS8-276 TAPE | 90 | 0.0075 |
| 8 | BMS8-276 TAPE | 45 | 0.0075 |
| 9 | BMS8-276 TAPE | -45 | 0.0075 |
| 10 | BMS8-276 TAPE | 0 | 0.0075 |
| 11 | BMS8-276 TAPE | 0 | 0.0075 |
| 12 | BMS8-276 TAPE | -45 | 0.0075 |
| 13 | BMS8-276 TAPE | 45 | 0.0075 |
| 14 | BMS8-276 TAPE | 90 | 0.0075 |
| 15 | BMS8-276 TAPE | 45 | 0.0075 |
| 16 | BMS8-276 TAPE | 90 | 0.0075 |
| 17 | BMS8-276 TAPE | 90 | 0.0075 |
| 18 | BMS8-276 TAPE | -45 | 0.0075 |
| 19 | BMS8-276 TAPE | 0 | 0.0075 |
| 20 | BMS8-276 TAPE | 0 | 0.0075 |

FIG. 8

| COMPOSITE LAYER | MATERIAL | ANGLE | THICKNESS |
|---|---|---|---|
| 1 | BMS8-276 TAPE | 0 | 0.0075 |
| 2 | BMS8-276 TAPE | 0 | 0.0075 |
| 3 | BMS8-276 TAPE | 0 | 0.0075 |
| 4 | BMS8-276 TAPE | 0 | 0.0075 |
| 5 | BMS8-276 TAPE | 0 | 0.0075 |
| 6 | BMS8-276 TAPE | 0 | 0.0075 |
| 7 | BMS8-276 TAPE | 0 | 0.0075 |
| 8 | BMS8-276 TAPE | 0 | 0.0075 |
| 9 | BMS8-276 TAPE | 0 | 0.0075 |
| 10 | BMS8-276 TAPE | 0 | 0.0075 |
| 11 | BMS8-276 TAPE | 0 | 0.0075 |
| 12 | BMS8-276 TAPE | 0 | 0.0075 |
| 13 | BMS8-276 TAPE | 45 | 0.0075 |
| 14 | BMS8-276 TAPE | -45 | 0.0075 |
| 15 | BMS8-276 TAPE | 45 | 0.0075 |
| 16 | BMS8-276 TAPE | -45 | 0.0075 |
| 17 | BMS8-276 TAPE | 90 | 0.0075 |
| 18 | BMS8-276 TAPE | -45 | 0.0075 |
| 19 | BMS8-276 TAPE | 45 | 0.0075 |
| 20 | BMS8-276 TAPE | 0 | 0.0075 |

FIG. 24A

| COMPOSITE LAYERS | ORIENTATION ANGLES | WIDTHS |
|---|---|---|
| 1 | 0 | |
| 2 | 0 | |
| 3 | 0 | |
| 4 | 0 | |
| 5 | 0 | |
| 6 | 0 | |
| 7 | 0 | |
| 8 | 0 | |
| 9 | 0 | |
| 10 | 0 | |
| 11 | 0 | |
| 12 | 0 | |
| 13 | 0 | |
| 14 | 0 | |
| 15 | 0 | |
| 16 | 0 | |
| 17 | 0 | |
| 18 | 0 | |
| 19 | 0 | |
| 20 | 0 | |
| 21 | 0 | 0.120 |
| 22 | 45 | 0.120 |
| 23 | 0 | 0.135 |
| 24 | -45 | 0.135 |
| 25 | 0 | 0.153 |
| 26 | 45 | 0.153 |
| 27 | 0 | 0.177 |
| 28 | -45 | 0.177 |
| 29 | 0 | 0.204 |
| 30 | 90 | 0.204 |

TO FIG. 24B

FROM FIG. 24A

| | | |
|---|---|---|
| 31 | 0 | 0.234 |
| 32 | 45 | 0.234 |
| 33 | 0 | 0.264 |
| 34 | -45 | 0.264 |
| 35 | 0 | 0.300 |
| 36 | 45 | 0.300 |
| 37 | 0 | 0.339 |
| 38 | -45 | 0.339 |
| 39 | 0 | 0.378 |
| 40 | 90 | 0.378 |
| 41 | 90 | 0.423 |
| 42 | 0 | 0.423 |
| 43 | -45 | 0.471 |
| 44 | 0 | 0.471 |
| 45 | 45 | 0.525 |
| 46 | 0 | 0.525 |
| 47 | -45 | 0.585 |
| 48 | 0 | 0.585 |
| 49 | 45 | 0.651 |
| 50 | 0 | 0.651 |
| 51 | 90 | 0.723 |
| 52 | 0 | 0.723 |
| 53 | -45 | 0.810 |
| 54 | 0 | 0.810 |
| 55 | 45 | 0.912 |
| 56 | 0 | 0.912 |
| 57 | -45 | 1.041 |
| 58 | 0 | 1.041 |
| 59 | 45 | 1.233 |
| 60 | 0 | 1.233 |

| COMPOSITE LAYERS | ORIENTATION ANGLES | WIDTHS |
|---|---|---|
| 1 | 0 | |
| 2 | 0 | |
| 3 | 0 | |
| 4 | 0 | |
| 5 | 0 | |
| 6 | 0 | |
| 7 | 0 | |
| 8 | 0 | |
| 9 | 0 | |
| 10 | 0 | |
| 11 | 0 | |
| 12 | 0 | |
| 13 | 0 | |
| 14 | 0 | |
| 15 | 0 | |
| 1 | 48 | 0.080 |
| 2 | -48 | 0.080 |
| 3 | 0 | 0.080 |
| 4 | 48 | 0.090 |
| 5 | -48 | 0.090 |
| 6 | 0 | 0.090 |
| 7 | 48 | 0.110 |
| 8 | -48 | 0.110 |
| 9 | 0 | 0.110 |
| 10 | 48 | 0.136 |
| 11 | -48 | 0.136 |
| 12 | 0 | 0.136 |
| 13 | 48 | 0.166 |
| 14 | -48 | 0.166 |
| 15 | 0 | 0.166 |

TO FIG. 25B

FROM FIG. 25A

| | | |
|---|---|---|
| 16 | 48 | 0.200 |
| 17 | -48 | 0.200 |
| 18 | 0 | 0.200 |
| 19 | 48 | 0.238 |
| 20 | -48 | 0.238 |
| 21 | 0 | 0.238 |
| 22 | 48 | 0.282 |
| 23 | -48 | 0.282 |
| 24 | 0 | 0.282 |
| 25 | 48 | 0.332 |
| 26 | -48 | 0.332 |
| 27 | 0 | 0.332 |
| 28 | 48 | 0.390 |
| 29 | -48 | 0.390 |
| 30 | 0 | 0.390 |
| 31 | 48 | 0.458 |
| 32 | -48 | 0.458 |
| 33 | 0 | 0.458 |
| 34 | 48 | 0.540 |
| 35 | -48 | 0.540 |
| 36 | 0 | 0.540 |
| 37 | 48 | 0.648 |
| 38 | -48 | 0.648 |
| 39 | 0 | 0.648 |
| 40 | 48 | 0.800 |
| 41 | -48 | 0.800 |
| 42 | 0 | 0.800 |

STACKED NOODLE FOR HIGH CAPACITY PULL-OFF FOR A COMPOSITE STRINGER

This application claims priority under 35 U.S.C. §371 to International Application No. PCT/US12/22796 filed on Jan. 26, 2012, which claims priority to Ser. No. 13/111,375 filed on May 19, 2011. The contents of both aforementioned applications are incorporated herein by reference.

BACKGROUND INFORMATION

1. Field

The present disclosure relates generally to aircraft and, in particular, to aircraft structures. Still more particularly, the present disclosure relates to stringers and other structural designs for an aircraft.

2. Background

Aircraft are being designed and manufactured with greater and greater percentages of composite materials. Some aircraft may have more than 50 percent of their primary structures made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials created by combining two or more dissimilar components. For example, a composite material may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

A stringer is an example of a component that may be manufactured from composite materials. A stringer is an elongate member and is configured for attachment to another structure, such as a panel. For example, a stringer may be attached to a skin panel for an aircraft. This skin panel may be used in a wing, fuselage, or other component in the aircraft. The stringer also may help carry and/or transfer loads. For example, a stringer may transfer a load from a skin panel to another structure. This other structure may be, for example, a frame or a rib.

Designing stringers with a desired weight and performance characteristics may be challenging. For example, a stringer with desired performance characteristics may be more complex or weigh more than desired. With increased complexity, time and cost for manufacturing a stringer also may increase. Further, if the stringer has a desired weight, performance characteristics may be such that additional stringers may be required where a single stringer is desired. Therefore, it would be desirable to have a method and apparatus that takes into account at least some of the issues discussed above, as well as possibly other issues.

SUMMARY

In one illustrative embodiment, an apparatus comprises a composite elongate member, a channel, and a number of composite structures. The composite elongate member has a side configured for attachment to a surface of a structure. The channel is on the side and extends along a length of the composite elongate member. The number of composite structures is configured for placement in the channel and configured to attach a portion of the side of the composite elongate member to the structure. A composite structure in the number of composite structures comprises layers having different orientations selected to increase a capacity of the composite elongate member to withstand forces that pull the composite elongate member away from the structure.

In another illustrative embodiment, a structural system for an aircraft comprises a composite elongate member and a filler structure. The composite elongate member has a base section and a vertical section in which the vertical section extends away from the base section in a direction substantially perpendicular to the base section to form a T-shape. The vertical section meets the base section at a first location of the vertical section and a second location of the vertical section. The first location has a first curved shape and the second location has a second curved shape. The first curved shape and the second curved shape have a substantially same radius. A channel is formed between the first location and the second location and extends along a length of the composite elongate member. The composite elongate member has a first Young's modulus. The filler structure comprises a number of composite structures configured to substantially conform to a shape of the channel. The number of composite structures has a second Young's modulus that is within a desired range from the first Young's modulus. A composite structure in the number of composite structures comprises layers having different orientations selected to increase a capacity of the composite elongate member to withstand forces that pull the composite elongate member away from the base section.

In yet another illustrative embodiment, a method for increasing a pull-off capacity for a composite elongate member is provided. When an aircraft is operated, forces configured to pull the composite elongate member away from a structure attached to a side of the composite elongate member are generated during operation of the aircraft. A channel extends along a length of the composite elongate member on the side of the composite elongate member attached to the structure and a number of composite structures in the channel. A composite structure in the number of composite structures comprises layers having different orientations selected such that a capacity of the composite elongate member to withstand the forces that pull the composite elongate member away from the structure is increased.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 7 is an illustration of a table of values for characteristics for composite layers in accordance with an illustrative embodiment;

FIG. 8 is an illustration of a table of values for characteristics of composite layers in accordance with an illustrative embodiment;

FIGS. 24A and 24B are an illustration of a table of widths and orientation angles for composite layers in a noodle in accordance with an illustrative embodiment;

FIGS. 25A and 25B are an illustration of another table of widths and orientation angles for composite layers in a noodle in accordance with an illustrative embodiment;

DETAILED DESCRIPTION

Figure 1:
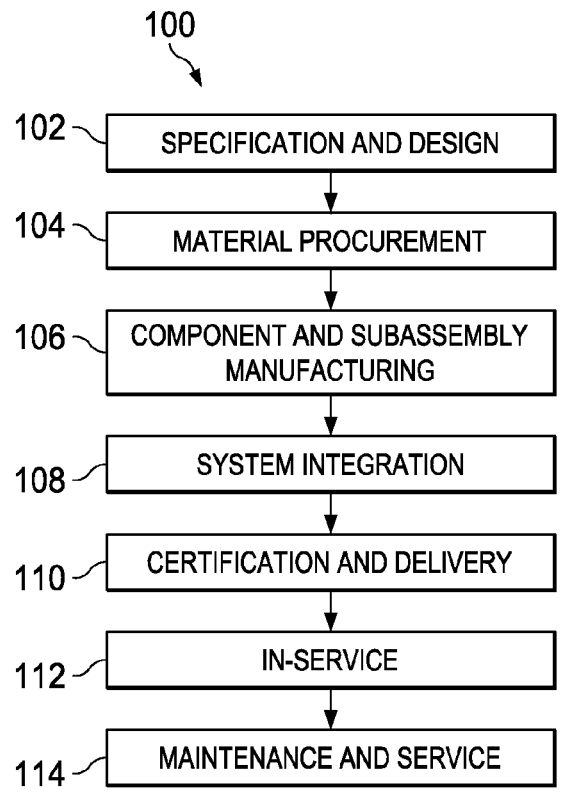
FIG. 1 is an illustration of an aircraft manufacturing and service method in accordance with an illustrative embodiment.
Figure 2:
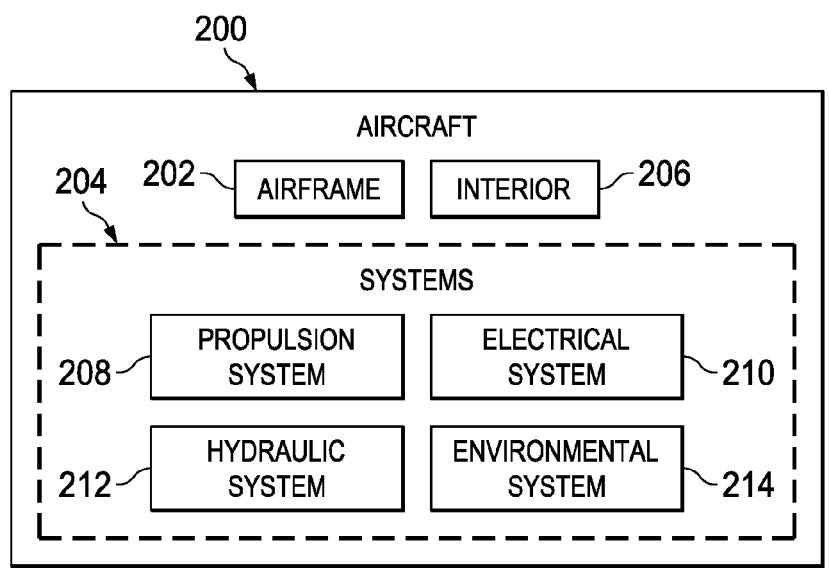
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 takes place. Thereafter, aircraft 200 may go through certification and delivery 110 in order to be placed in-service 112. While in-service 112 by a customer, aircraft 200 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 100. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in-service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in-service 112 and/or during maintenance and service 114 in FIG. 1. The use of a number of the different illustrative embodiments may substantially expedite the assembly of and/or reduce the cost of aircraft 200.

The different illustrative embodiments recognize and take into account a number of different considerations. For example, the different illustrative embodiments recognize and take into account that the current design of stringers employs the use of composite materials referred to as noodles. A noodle is a composite material that may be placed in an area or channel extending along a length of the stringer or other type of elongate member.

The different illustrative embodiments recognize and take into account that currently, these noodles are designed to ease in manufacturing stringers. The different illustrative embodiments recognize and take into account that different characteristics or parameters about the noodle may not match characteristics or parameters in the rest of the stringer with this type of goal in mind The different illustrative embodiments recognize and take into account that this type of design of the noodle in the stringer may reduce desired performance characteristics, such as the amount of force needed to pull the stringer away from a skin panel.

Therefore, the different illustrative embodiments provide a method and apparatus for a stringer that has a greater ability to withstand forces that may pull the stringer away from another structure to which the stringer is attached. The different illustrative embodiments recognize and take into account that an illustrative embodiment may be applied to any type of elongate member having a base in which a noodle is present.

In one illustrative embodiment, an apparatus comprises a composite elongate member, a channel, and a number of composite structures. The composite elongate member has a side configured for attachment to a structure. The channel is on the side of the composite elongate member and extends along a length of the composite elongate member. The number of composite structures is configured for placement in the channel and to attach a portion of the side of the composite elongate member to the structure. The number of composite structures is configured to increase a capacity of the composite elongate member to withstand forces that pull the composite elongate member away from the structure.

In another illustrative embodiment, an apparatus comprises a composite elongate member, a channel, and a number of composite structures. The composite elongate member has a side configured for attachment to a structure. The channel is on the side and extends along a length of the composite elongate member. The number of composite structures is configured for placement in the channel and configured to attach a portion of the side of the composite elongate member to the structure. The number of composite structures has layers oriented substantially perpendicular to a surface of the structure configured to increase a capacity of the composite elongate member to withstand forces that pull the composite elongate member away from the structure.

In yet another illustrative embodiment, an apparatus comprises a composite elongate member, a channel, and a number of composite structures. The composite elongate member has a side configured for attachment to a structure. The channel is on the side and extends along a length of the composite elongate member. The number of composite structures is configured for placement in the channel and configured to attach a portion of the side of the composite elongate member to the structure. A composite structure in the number of composite structures comprises layers having different orientations selected to increase a capacity of the composite elongate member to withstand forces that pull the composite elongate member away from the structure.

Figure 3:
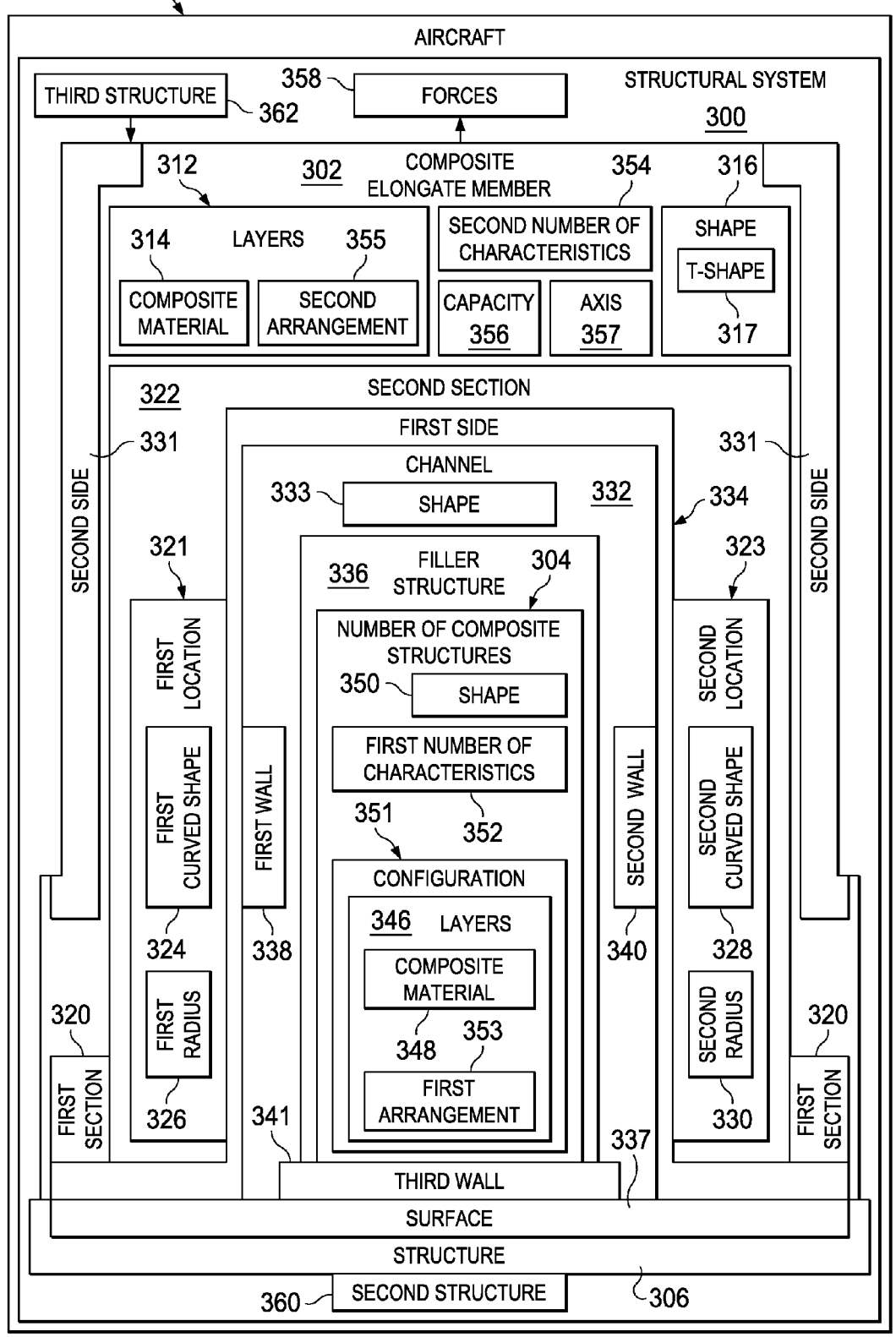
FIG. 3 is an illustration of a structural system in accordance with an illustrative embodiment.

With reference now to FIG. 3, an illustration of a structural system is depicted in accordance with an illustrative embodiment. In these illustrative examples, structural system 300 is depicted in block form. Structural system 300 is located in aircraft 301 in these illustrative examples. As depicted, structural system 300 comprises composite elongate member 302, number of composite structures 304, and structure 306.

In these depicted examples, composite elongate member 302 is formed from layers 312 of composite material 314. For example, layers 312 of composite material 314 are laid up and shaped into shape 316 for composite elongate member 302. Shape 316 may be T-shape 317 in these illustrative examples.

As depicted, T-shape 317 for composite elongate member 302 is formed by first section 320 and second section 322 of composite elongate member 302. In these illustrative examples, first section 320 may be referred to as a base section, and second section 322 may be referred to as a vertical section. First section 320 and second section 322 may be part of the same structure in these examples. Of course, in other illustrative examples, first section 320 and second section 322 may be formed from different structures.

Second section 322 is positioned substantially perpendicular to first section 320 to form T-shape 317 for composite elongate member 302. In particular, second section 322 is the portion of composite elongate member 302 that extends away from first section 320 in a direction that is substantially perpendicular to first section 320.

In these illustrative examples, first section 320 is substantially planar. Further, first section 320 is a discontinuous section. In particular, first section 320 may be discontinuous where second section 322 meets first section 320.

Second section 322 meets first section 320 at first location 321 and second location 323 of second section 322. First location 321 of second section 322 has first curved shape 324 with first radius 326. Second location 323 of second section 322 has second curved shape 328 with second radius 330.

First radius 326 is a radius for a circle that substantially fits first curved shape 324. Second radius 330 is a radius for a circle that substantially fits second curved shape 328. In these illustrative examples, first radius 326 may be substantially equal to second radius 330.

First section 320 and second section 322 are positioned relative to each other to form channel 332. In particular, channel 332 is formed between first location 321 and second location 323 of second section 322. First radius 326 of first curved shape 324 for first location 321 and second radius 330 of second curved shape 328 for second location 323 determine shape 333 of channel 332.

In these illustrative examples, channel 332 is formed at first side 334 of composite elongate member 302. Channel 332 extends along a length of composite elongate member 302 in these examples. Composite elongate member 302 also has second side 331 opposite to first side 334.

First side 334 may be, for example, a base side for both first section 320 and second section 322. First side 334 is configured for attachment to structure 306. Structure 306 may be, for example, without limitation, a skin panel, a rib, a spar, a base charge, a base plate, and/or some other suitable type of structure.

In one illustrative example, first side 334 of first section 320 of composite elongate member 302 is substantially planar. Structure 306 may be attached to first side 334 of first section 320 such that surface 337 of structure 306 directly contacts first side 334 of first section 320 in this illustrative example.

In these illustrative examples, a first component, such as structure 306, may be attached to a second component, such as composite elongate member 302, in a number of different ways. For example, a first component may be attached to a second component by bonding, curing, fastening, gluing, connecting, and/or attaching in some other suitable manner the two components to each other.

First side 334 of second section 322 at first location 321 and second location 323 forms first wall 338 and second wall 340 of channel 332. In this manner, first side 334 of second section 322 at first location 321 and second location 323 may not directly contact surface 337 of structure 306 when structure 306 is attached to composite elongate member 302. Further, when attached to composite elongate member 302, surface 337 of structure 306 forms third wall 341.

Number of composite structures 304 may be placed into channel 332. Number of composite structures 304 may be comprised of layers 346 of composite material 348. As depicted, number of composite structures 304 has shape 350 that substantially conforms to shape 333 of channel 332. Number of composite structures 304 forms filler structure 336 for channel 332. Filler structure 336 may be referred to as a noodle in these illustrative examples. Each of number of composite structures 304 is a segment of filler structure 336.

For example, number of composite structures 304 may comprise a base segment, a top segment, and a set of intermediate segments located between the base segment and the top segment. As used herein, a "set of items" means zero or more items. For example, a set of intermediate segments may be an empty set or null set.

In these illustrative examples, number of composite structures 304 has first number of characteristics 352 that substantially match second number of characteristics 354 for composite elongate member 302. First number of characteristics 352 and second number of characteristics 354 may comprise, for example, without limitation, at least one of a coefficient of thermal expansion, a Young's modulus, and other suitable characteristics.

As one illustrative example, layers 346 for number of composite structures 304 may have configuration 351. Configuration 351 for layers 346 is selected such that first number of characteristics 352 for number of composite structures 304 substantially matches second number of characteristics 354 for composite elongate member 302. For example, with configuration 351, a value for a Young's modulus for number of composite structures 304 may be within a desired range from a value for a Young's module for composite elongate member 302.

Further, layers 346 for number of composite structures 304 may have first arrangement 353 that is substantially equal to second arrangement 355 for layers 312 for composite elongate member 302. First arrangement 353 for layers 346 of number of composite structures 304 is an arrangement of layers 346 relative to axis 357 through composite elongate member 302. In particular, first arrangement 353 for layers 346 is an arrangement of fibers in layers 346 relative to axis 357 through composite elongate member 302.

As one illustrative example, first arrangement 353 may comprise about 50 percent of layers 346 arranged about zero degrees relative to axis 357, about 40 percent of layers 346 arranged about 45 degrees relative to axis 357, and about 10 percent of layers 346 arranged about 90 degrees relative to axis 357. In this illustrative example, second arrangement 355 for layers 312 of composite elongate member 302 may have substantially the same percentages of layers 312 arranged substantially the same as first arrangement 353.

Number of composite structures 304 is configured to attach structure 306 to composite elongate member 302. More specifically, number of composite structures 304 attaches a portion of surface 337 of structure 306 to the portions of first side 334 at first location 321 and second location 323 of second section 322 for composite elongate member 302.

When first number of characteristics 352 and second number of characteristics 354 substantially match, capacity 356 of composite elongate member 302 to withstand forces 358 increases. Forces 358 are generated when pressure is applied to composite elongate member 302 and structure 306. For example, pressure may be applied to composite elongate member 302 and structure 306 when aircraft 301 is being operated.

As one illustrative example, pressurization in a cabin of aircraft 301 may cause pressure to be applied to composite elongate member 302 and structure 306 when composite elongate member 302 and structure 306 are part of a fuselage of aircraft 301. As another illustrative example, pressure may be applied to composite elongate member 302 and structure 306 in response to the movement of fuel in a fuel tank in a wing of aircraft 301 when composite elongate member 302 and structure 306 are part of the wing of aircraft 301.

The pressure applied to composite elongate member 302 and structure 306 may be in a direction substantially perpendicular to surface 337 of structure 306 in these illustrative examples. This pressure generates forces 358. Forces 358 may include any forces that pull composite elongate member 302 away from structure 306 when structure 306 is attached to composite elongate member 302 at first side 334. In other words, forces 358 include any forces that create a tensile load where composite elongate member 302 is attached to structure 306.

Forces 358 may be substantially perpendicular to surface 337 of structure 306 in these illustrative examples. Further, forces 358 may be substantially perpendicular to first side 334 of first section 320 of composite elongate member 302.

The illustration of structural system 300 in FIG. 3 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, more than one structure may be attached to composite elongate member 302 at first side 334. As one illustrative example, second structure 360 may be attached to structure 306. For example, when structure 306 takes the form of a base charge, second structure 360 may be a skin panel that is attached to the base charge. In some illustrative examples, the base charge may have the same arrangement as second arrangement 355 for composite elongate member 302.

As another illustrative example, third structure 362 may be attached to second side 331 of second section 322 of composite elongate member 302. Third structure 362 may be, for example, a rib, a spar, or some other suitable type of structure.

In still other illustrative examples, structural system 300 may include one or more composite members in addition to or in place of composite elongate member 302 attached to structure 306. For example, a plurality of stringers may be attached to structure 306 in the form of a skin panel to form structural system 300.

In some cases, structural system 300 may be located in a platform other than aircraft 301. For example, structural system 300 may be located in a platform selected from at least one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

Figure 4:
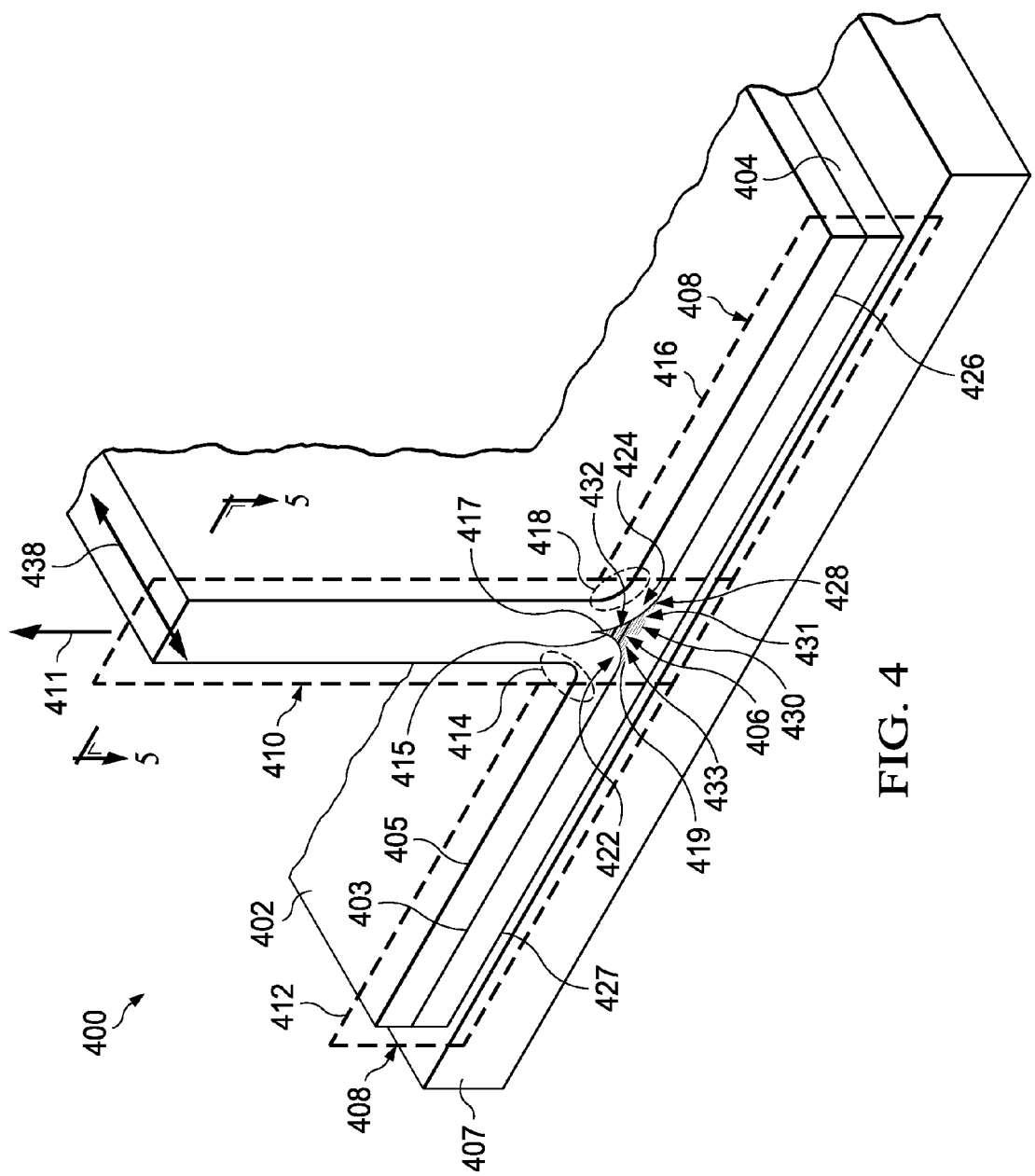
FIG. 4 is an illustration of a perspective view of a structural system in accordance with an illustrative embodiment.

With reference now to FIG. 4, an illustration of a perspective view of a structural system is depicted in accordance with an illustrative embodiment. In this illustrative example, structural system 400 is an example of one implementation for structural system 300 in FIG. 3. The different components shown in this figure and in FIGS. 5, 6, and 9-17 may be combined with components in FIG. 3, used with components in FIG. 3, or a combination of the two. Additionally, some of the components in this figure may be illustrative examples of how components shown in block form in FIG. 3 may be implemented as physical structures.

As depicted, structural system 400 includes stringer 402, base charge 404, skin 407, and noodle 406. Stringer 402 is an example of one implementation for composite elongate member 302 in FIG. 3. Base charge 404 is an example of one implementation for structure 306 in FIG. 3, and noodle 406 is an example of one implementation for filler structure 336 in FIG. 3.

In this illustrative example, stringer 402 is a blade stringer. Stringer 402 has first side 403 and second side 405. Further, stringer 402 has first section 408 and second section 410. First section 408 and second section 410 are part of the same structure in this example. As depicted, first section 408 is a discontinuous section.

Second section 410 is positioned relative to first section 408 such that second section 410 extends away from first section 408 in the direction of arrow 411. Arrow 411 has a direction that is substantially perpendicular to first section 408.

In this depicted example, second section 410 meets first portion 412 of first section 408 at first location 414 of second section 410 and second portion 416 of first section 408 at second location 418 of second section 410. First location 414 has first curved shape 422. Second location 418 has second curved shape 424.

In this illustrative example, base charge 404 is attached to first side 403 of stringer 402. In particular, first surface 426 of base charge 404 contacts first side 403 of first section 408. Skin 407 is attached to second surface 427 of base charge 404. As depicted, first surface 426 does not come into contact with first side 403 of second section 410.

Channel 428 is formed at first side 403 of stringer 402 between first location 414 and second location 418 of second section 410. First side 403 at first location 414 forms first wall 415 for channel 428, and first side 403 at second location 418 forms second wall 417 for channel 428. Further, first surface 426 of base charge 404 forms third wall 419 for channel 428. In this manner, channel 428 has shape 430 that is conical in this illustrative example.

Noodle 406 is located in channel 428. Noodle 406 comprises number of composite structures 431. Number of composite structures 431 is an example of one implementation for number of composite structures 304 in FIG. 3. Number of composite structures 431 is comprised of composite layers 432. Composite layers 432 are layers of composite material.

The configuration of composite layers 432 is selected such that shape 433 of noodle 406 substantially conforms to shape 430 of channel 428. Further, with noodle 406, a capacity for stringer 402 to withstand forces that pull stringer 402 away from base charge 404 and/or skin 407 is increased as compared to when noodle 406 is absent or when a different type of noodle is present. These forces are in the direction of arrow 411.

As depicted, composite layers 432 for noodle 406 may be laid up substantially perpendicular to first side 403 and first surface 426 of base charge 404. Further, each of composite layers 432 may be arranged having a particular angle with respect to axis 438 through stringer 402.

Figure 5:
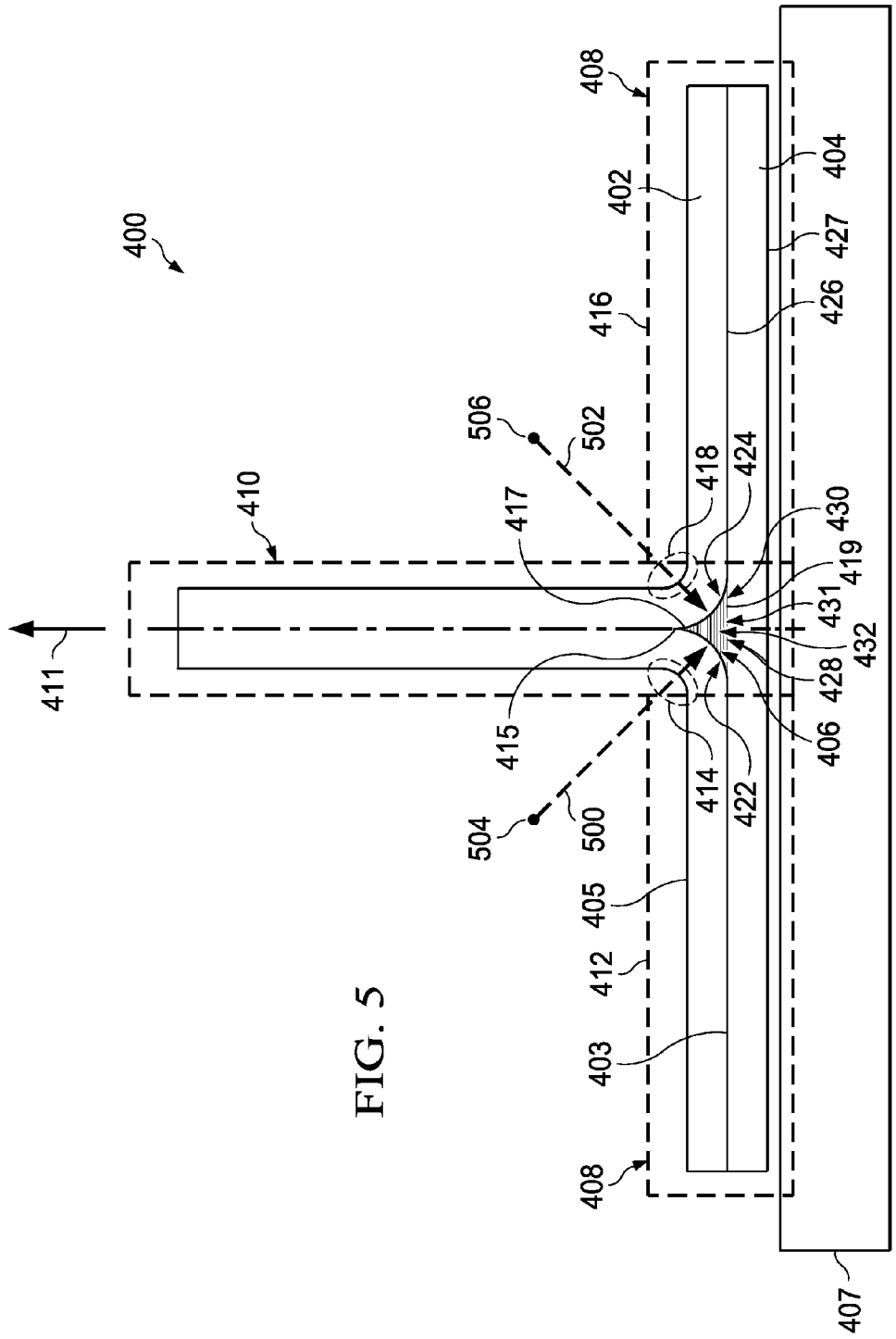
FIG. 5 is an illustration of a cross-sectional view of a structural system in accordance with an illustrative embodiment.

With reference now to FIG. 5, an illustration of a cross-sectional view of a structural system is depicted in accordance with an illustrative embodiment. In this illustrative example, a cross-sectional view of structural system 400 from FIG. 4 is depicted taken along lines 5-5 in FIG. 4. Second section 410 of stringer 402 is positioned substantially perpendicular relative to first section 408 of stringer 402.

As depicted in this example, first curved shape 422 has first radius 500. Further, second curved shape 424 has second radius 502. First radius 500 is a distance from the portion of first side 403 in first location 414 that forms first curved shape 422 to point 504. Similarly, second radius 502 is a distance from the portion of first side 403 in second location 418 that forms second curved shape 424 to point 506.

First curved shape 422 is an example of one implementation for first curved shape 324 in FIG. 3. Second curved shape 424 is an example of one implementation for second curved shape 328 in FIG. 3. In this illustrative example, each of first curved shape 422 and second curved shape 424 take the form of a portion of a circle. Of course, in other illustrative examples, each of first curved shape 422 and second curved shape 424 may take some other suitable form, such as, for example, a portion of an oval, an arc, a portion of an ellipse, or some other suitable type of curved shape.

Figure 6:
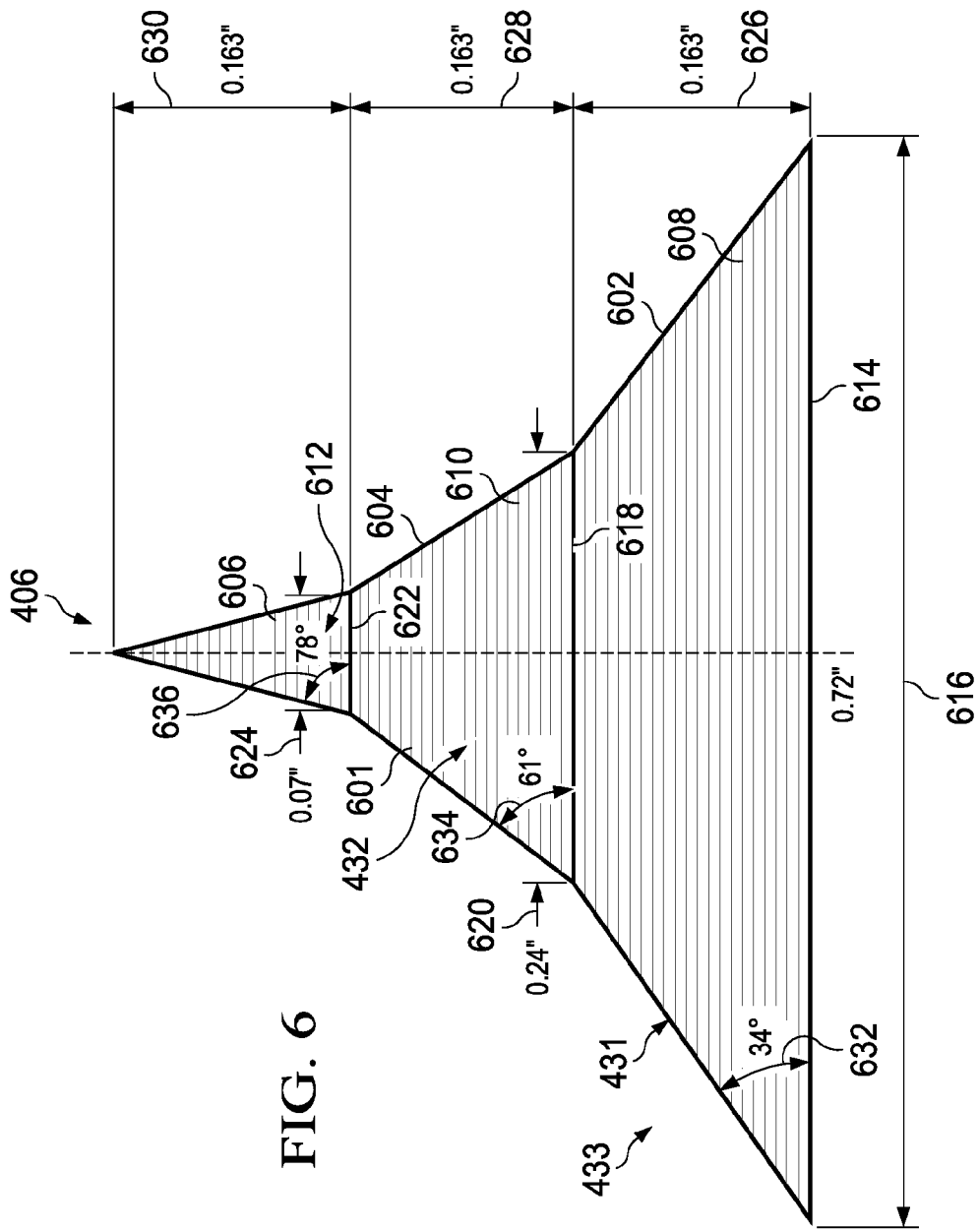
FIG. 6 is an illustration of a noodle in accordance with an illustrative embodiment.

Turning now to FIG. 6, an illustration of a noodle is depicted in accordance with an illustrative embodiment. In this illustrative example, noodle 406 from FIGS. 4-5 is depicted in greater detail. As depicted, noodle 406 has configuration 601 for number of composite structures 431 comprising composite layers 432. In particular, number of composite structures 431 includes composite structure 602, composite structure 604, and composite structure 606.

Composite structure 602 is configured to contact third wall 419 of channel 428 and a base portion of first wall 415 and second wall 417 in FIG. 4. Composite structure 606 is configured to contact an apical portion of first wall 415 and second wall 417 of channel 428 in FIG. 4. Composite structure 604 is located between composite structure 602 and composite structure 606. These composite structures form shape 433 for noodle 406 that substantially conforms to shape 430 of channel 428 in FIG. 4.

Composite structure 602, composite structure 604, and composite structure 606 may also be referred to as segments. For example, composite structure 602 may be a base segment, composite structure 606 may be a top segment, and composite structure 604 may be an intermediate segment between the base segment and the top segment.

In this illustrative example, composite structure 602 is formed from composite layers 608, composite structure 604 is formed from composite layers 610, and composite structure 606 is formed from composite layers 612.

Configuration 601 for noodle 406 is selected such that shape 433 of noodle 406 substantially conforms to shape 430 of channel 428 in FIGS. 4-5. As depicted, base 614 of composite structure 602 has length 616. Base 618 of composite structure 604 has length 620, and base 622 of composite structure 606 has length 624.

Further, composite structure 602 has height 626, composite structure 604 has height 628, and composite structure 606 has height 630. Additionally, composite structure 602 has angle 632 at base 614. Composite structure 604 has angle 634 at base 618. Composite structure 606 has angle 636 at base 622.

With reference now to FIG. 7, an illustration of a table of values for characteristics for composite layers is depicted in accordance with an illustrative embodiment. In this illustrative example, table 700 provides values for characteristics for composite layers 608 for composite structure 602 in noodle 406 in FIG. 6.

As depicted, table 700 includes composite layer 702, material 704, angle 706, and thickness 708. Composite layer 702 identifies the particular layer within composite layers 608. In these illustrative examples of embodiments for composite layers 608, composite layers 608 include about 20 layers of composite material.

Further, material 704 identifies the particular type of material from which a layer is formed. In this illustrative example, all of composite layers 608 are comprised of the same type of material. Angle 706 identifies the angle at which a layer is arranged with respect to axis 438 through stringer 402 in FIG. 4. As depicted, different layers may be arranged at different angles with respect to axis 438. Thickness 708 identifies a thickness of a layer. In these illustrative examples, all of composite layers 608 have substantially the same thickness.

Composite layers 610 for composite structure 604 in FIG. 6 may have substantially the same characteristics as composite layers 608. For example, composite layers 610 may also include about 20 layers that are comprised of substantially the same material and have substantially the same thickness. Further, the different layers in composite layers 610 may be arranged having substantially the same angles with respect to axis 438 in FIG. 4 as composite layers 608.

With reference now to FIG. 8, an illustration of a table of values for characteristics of composite layers is depicted in accordance with an illustrative embodiment. In this illustrative example, table 800 provides values for characteristics for composite layers 612 for composite structure 606 in noodle 406 in FIG. 6.

Similar to table 700 in FIG. 7, table 800 includes composite layer 802, material 804, angle 806, and thickness 808. The embodiments of each of the characteristics for layers described in each of first curved shape 422 and second curved shape 424 in FIG. 4 may be combined with each of the characteristics for layers described in FIG. 7.

Figure 9:
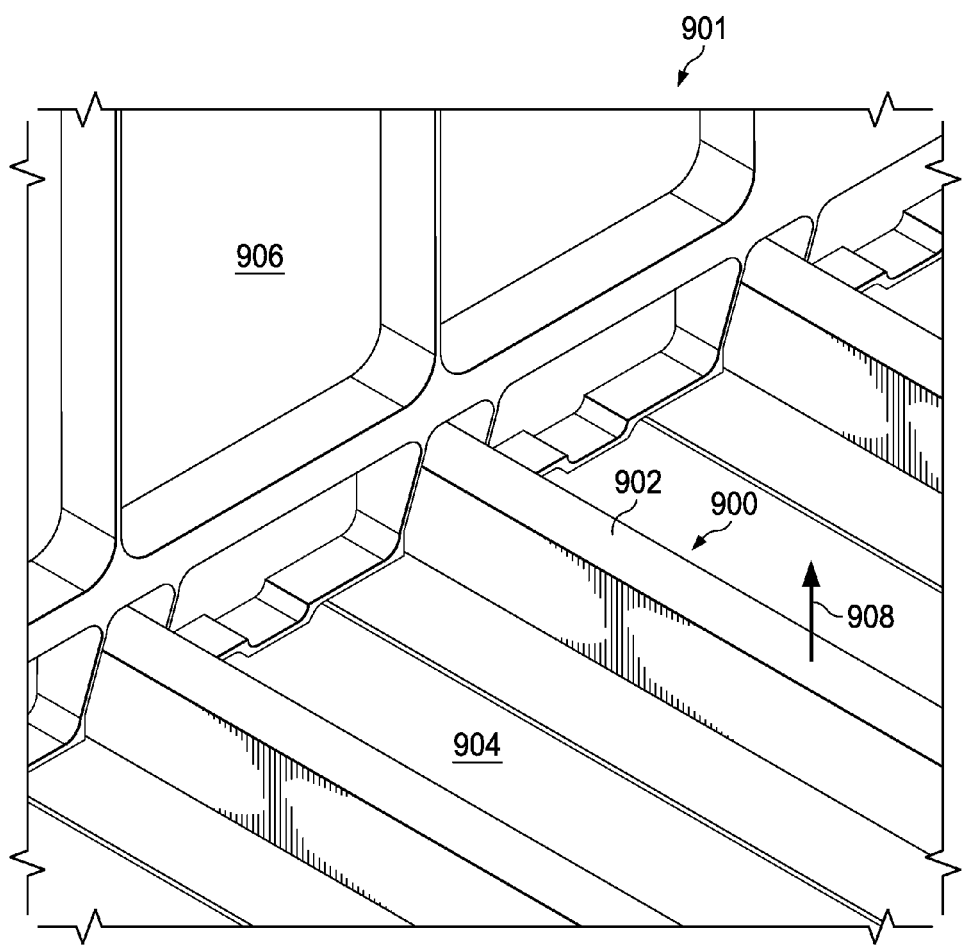
FIG. 9 is an illustration of a structural system in a wing in accordance with an illustrative embodiment.

With reference now to FIG. 9, an illustration of a structural system in a wing is depicted in accordance with an illustrative embodiment. In this illustrative example, structural system 900 is located inside wing 901 of an aircraft, such as aircraft 301 in FIG. 3.

Structural system 900 includes stringers 902 attached to skin panel 904. Stringers 902, in this illustrative example, are hat stringers. In this depicted example, filler structures (not shown in this view), such as filler structure 336 in FIG. 3, may attach at least a portion of each of stringers 902 to a base charge (not shown in this view). The base charges (not shown) for stringers 902 connect stringers 902 to skin panel 904.

Further, as illustrated, rib 906 is attached to stringers 902 and skin panel 904. Rib 906 is a shear-tied rib in this depicted example. The filler structures (not shown) provide an increased capacity for stringers 902 to withstand forces that pull stringers 902 and/or rib 906 away from skin panel 904 in the direction of arrow 908.

Figure 10:
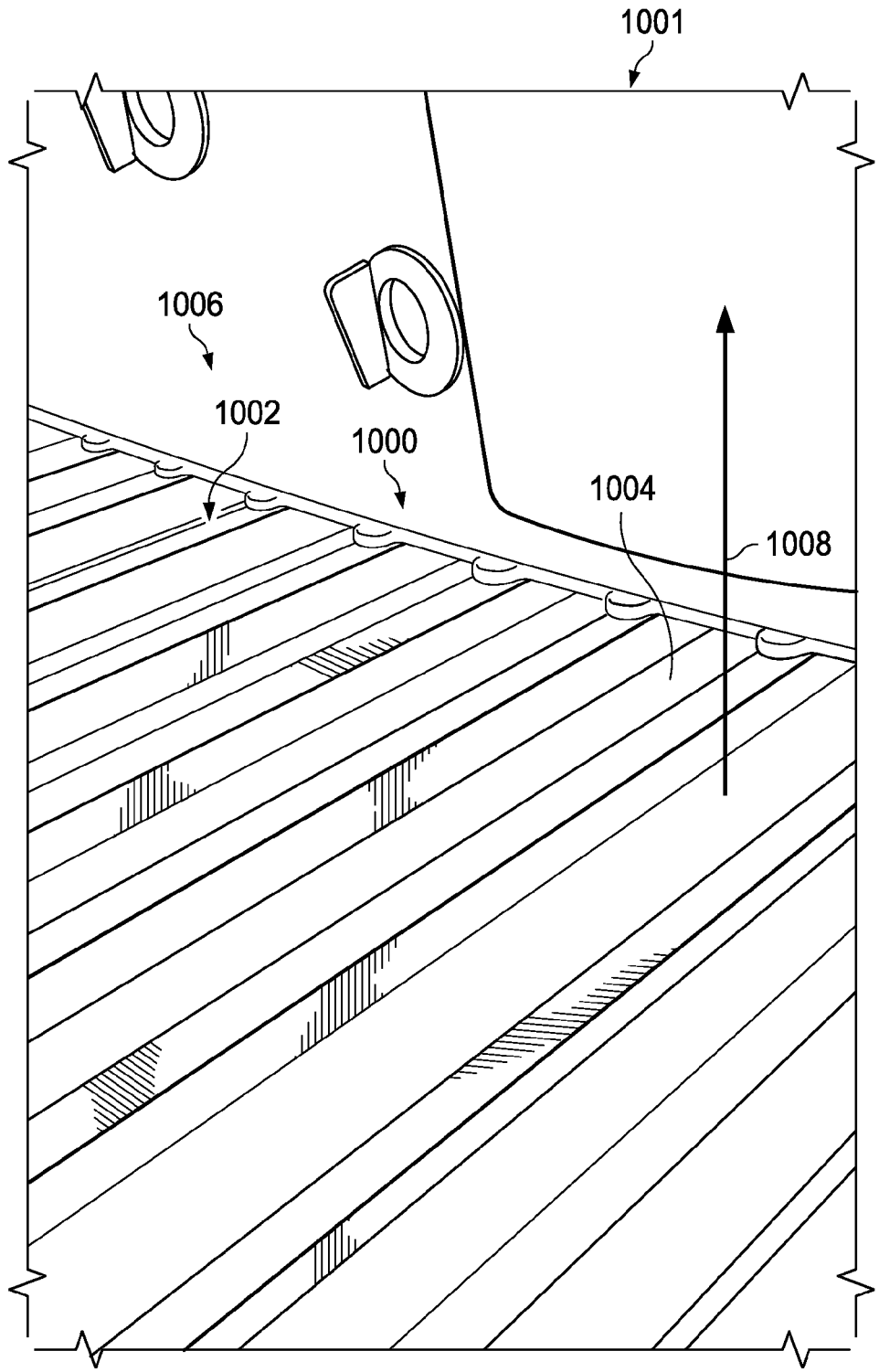
FIG. 10 is an illustration of a structural system in a wing in accordance with an illustrative embodiment.

Turning now to FIG. 10, an illustration of a structural system in a wing is depicted in accordance with an illustrative embodiment. In this illustrative example, structural system 1000 is located inside wing 1001 of an aircraft, such as aircraft 301 in FIG. 3.

Structural system 1000 includes stringers 1002 attached to skin panel 1004. Stringers 1002 are hat stringers in this depicted example.

Using filler structures (not shown), such as filler structure 336 in FIG. 3, to attach portions of stringers 1002 to skin panel 1004 provides an increased capacity for stringers 1002 to withstand forces that pull stringers 1002 away from skin panel 1004 in the direction of arrow 1008. This increased capacity to withstand these forces allows rib 1006 to be attached to stringers 1002 without being attached to skin panel 1004.

With reference now to FIGS. 11-14, illustrations of the different stages of forming a structural system are depicted in accordance with an illustrative embodiment. These figures provide an example of forming a structural system, such as structural system 300 in FIG. 3.

Figure 11:
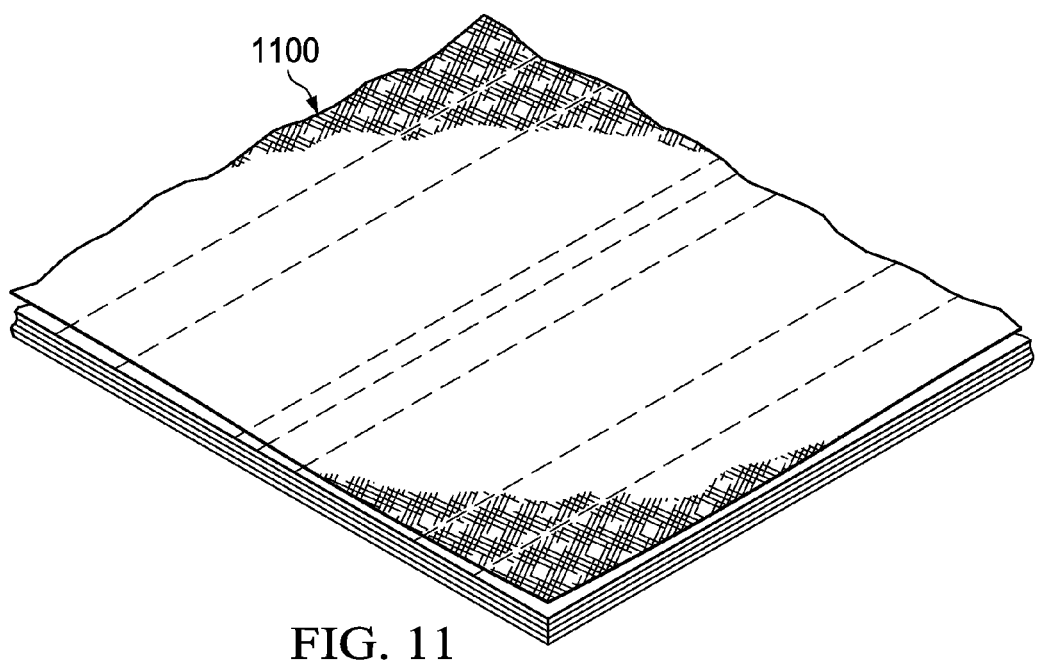
FIGS. 11-14 are illustrations of a structural system during the different stages for forming the structural system in accordance with an illustrative embodiment.

Turning now to FIG. 11, composite layers 1100 are laid up. Composite layers 1100 are examples of one implementation for layers 312 of composite material 314 in FIG. 3. Composite layers 1100 may be used to form a shape for a composite elongate member, such as shape 316 for composite elongate member 302 in FIG. 3.

Figure 12:
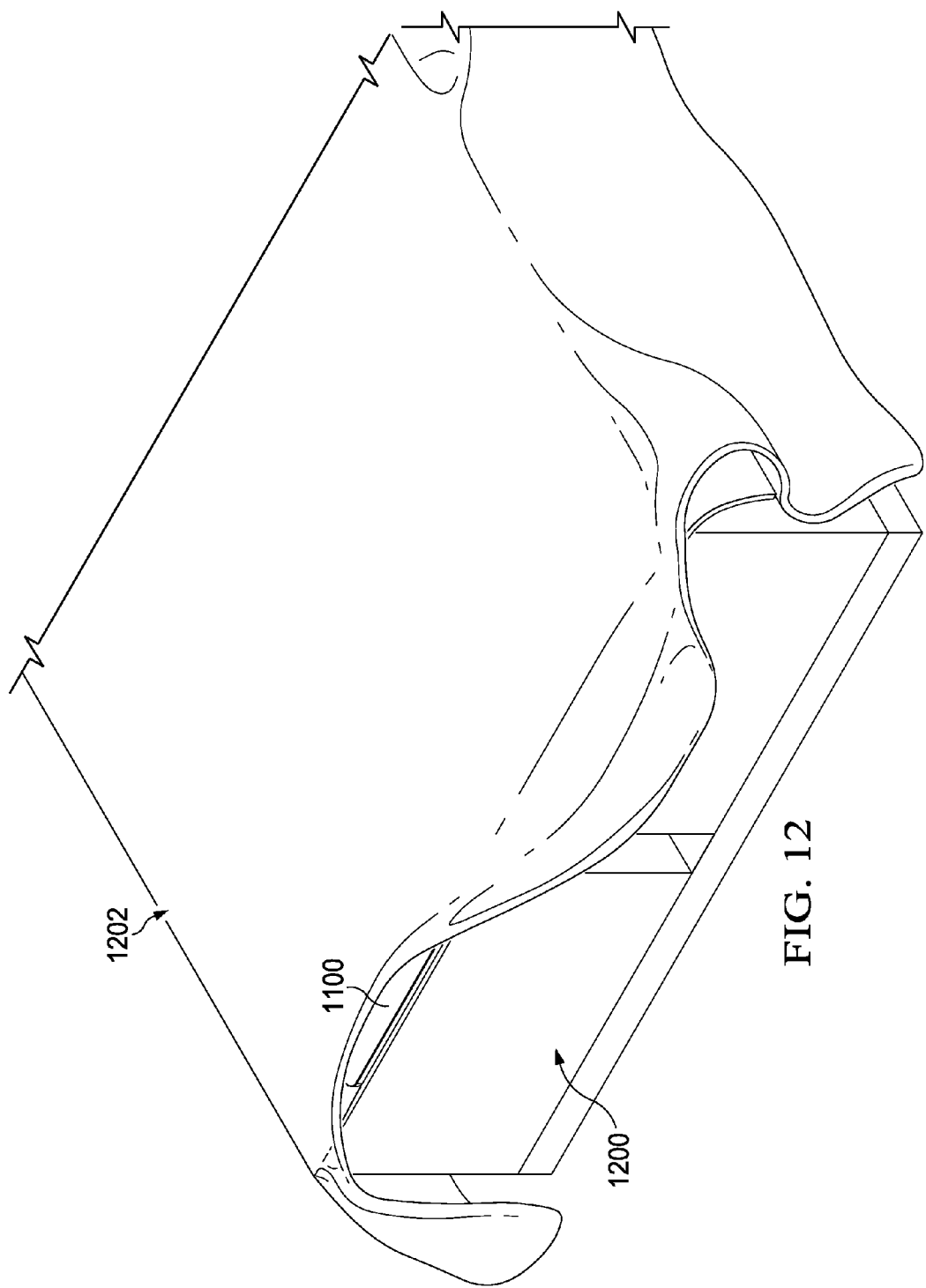

In FIG. 12, heating element 1200 is placed over composite layers 1100. Heating element 1200 is a heating blanket in this illustrative example. Further, insulation element 1202 is placed over heating element 1200. Insulation element 1202 is an insulation blanket in this illustrative example. With heating element 1200 and insulation element 1202 over composite layers 1100, composite layers 1100 are heated. In one illustrative example, composite layers 1100 are heated to about 110 degrees Fahrenheit to shape composite layers 1100 to form a shape for a stringer.

Figure 13:
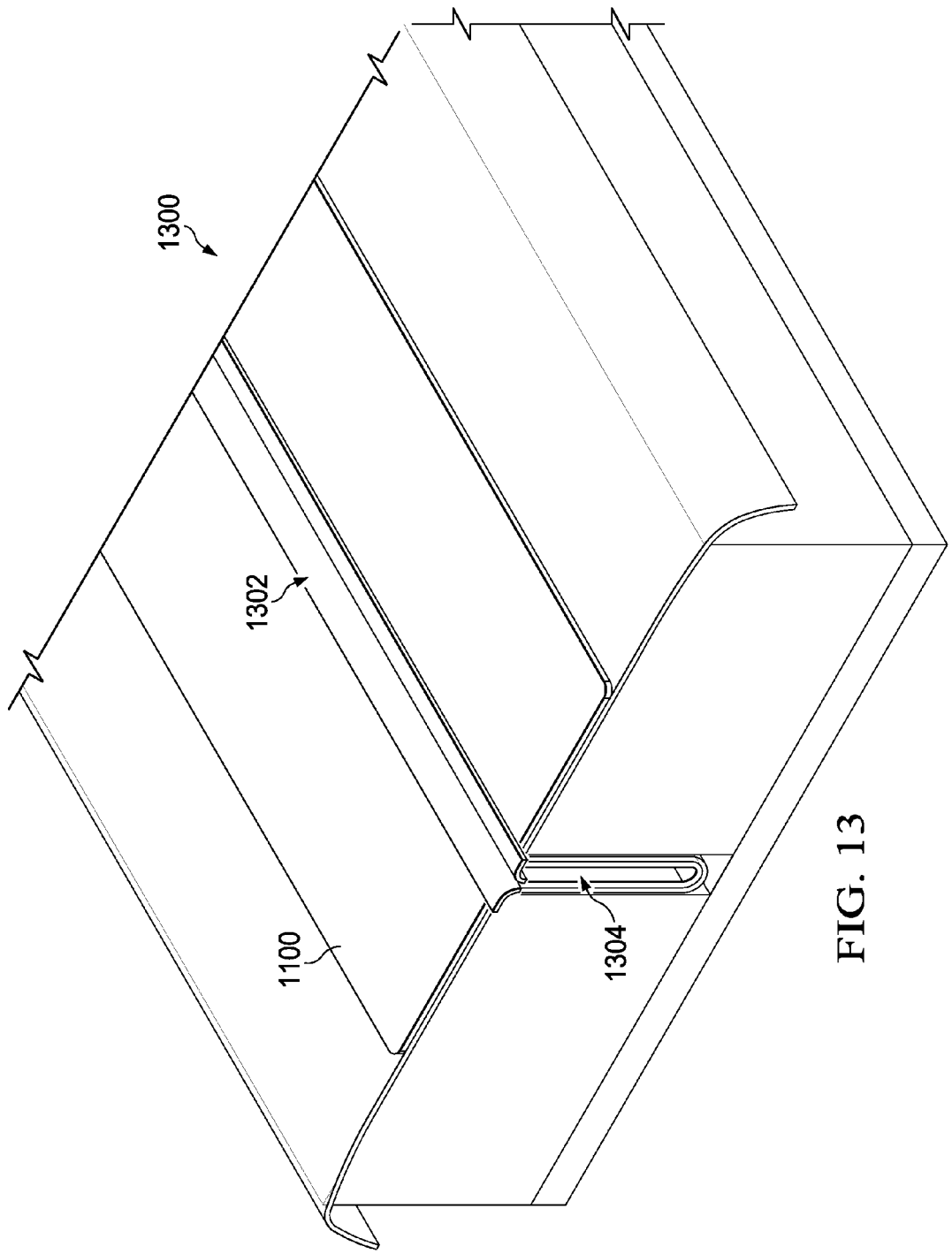

With reference now to FIG. 13, composite layers 1100 have been heated to form shape 1300. Composite layers 1100 with shape 1300 form stringer 1302. In this illustrative example, channel 1304 is formed in stringer 1302.

Figure 14:
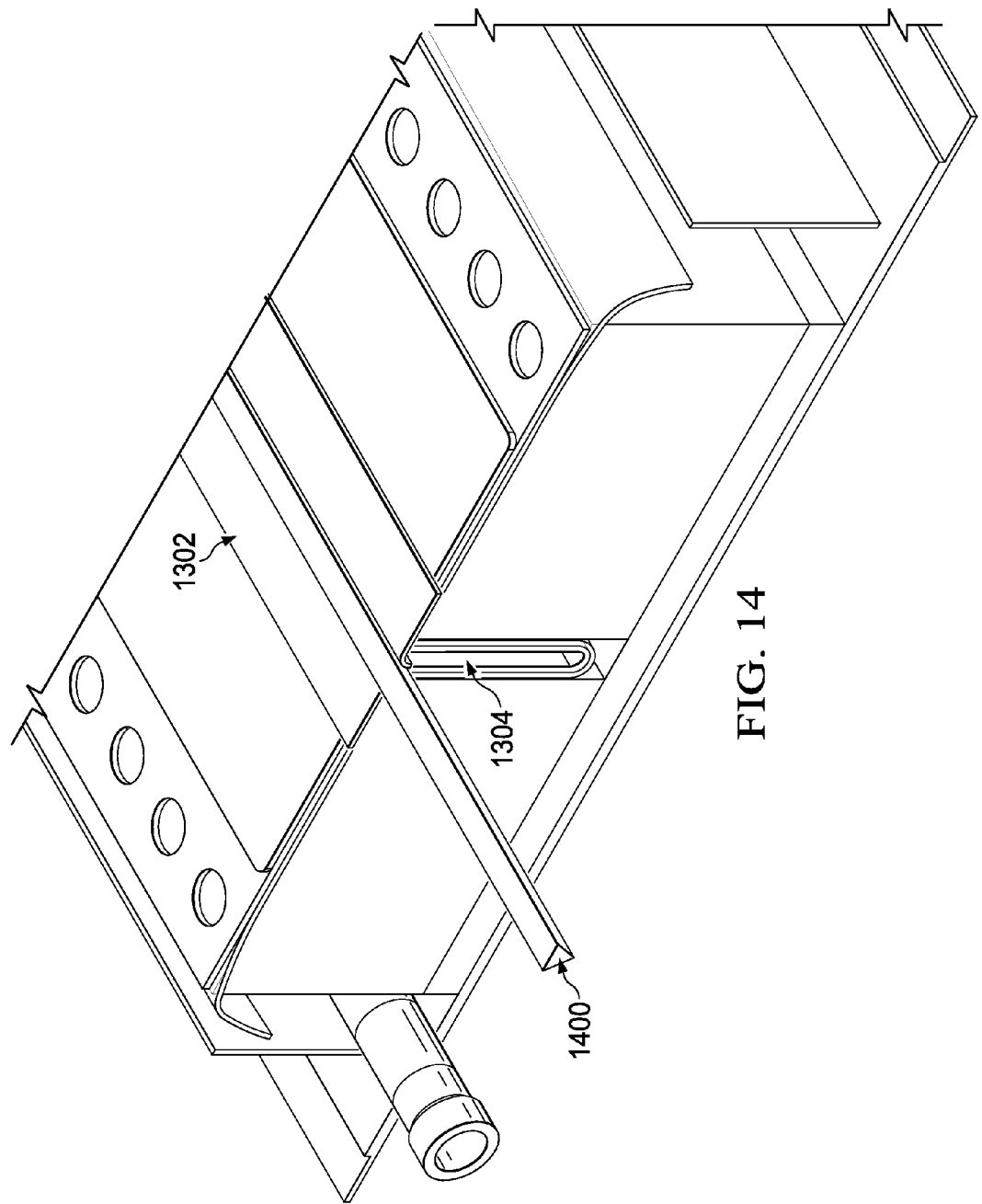

In FIG. 14, noodle 1400 is placed into channel 1304. Noodle 1400 may be implemented using, for example, noodle 406 in FIG. 6. A base charge (not shown) may be placed over noodle 1400 and stringer 1302. A skin panel (not shown) may then be placed over the base charge. Stringer 1302, noodle 1400, the base charge, and the skin panel are then cured together. This curing may be performed by heating these different components together. For example, these different components may be cured in an oven, an autoclave, or some other suitable device configured to heat components.

In some cases, the components may be placed in a bag. These components may then be heated, while a vacuum is applied to the bag to generate pressure and heat to form a structural system from the assembly of the components.

Figure 15:
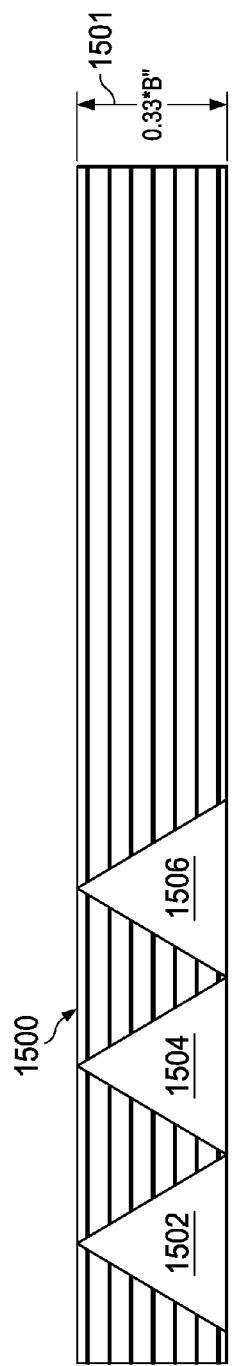
FIGS. 15-17 are illustrations of panels from which composite structures for noodles are formed in accordance with an illustrative embodiment.
Figure 16:
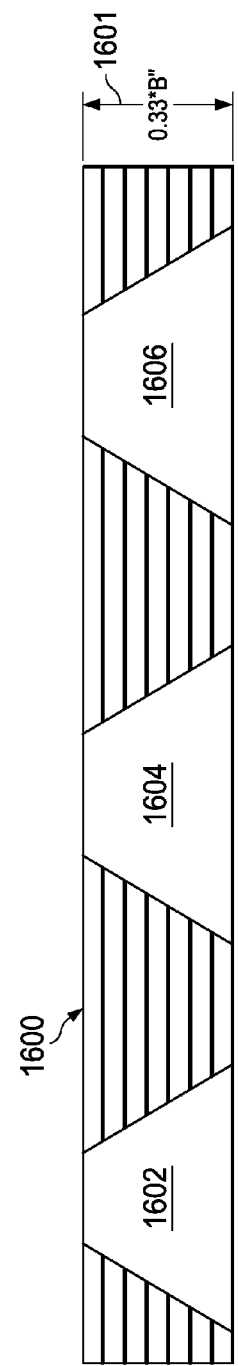
Figure 17:
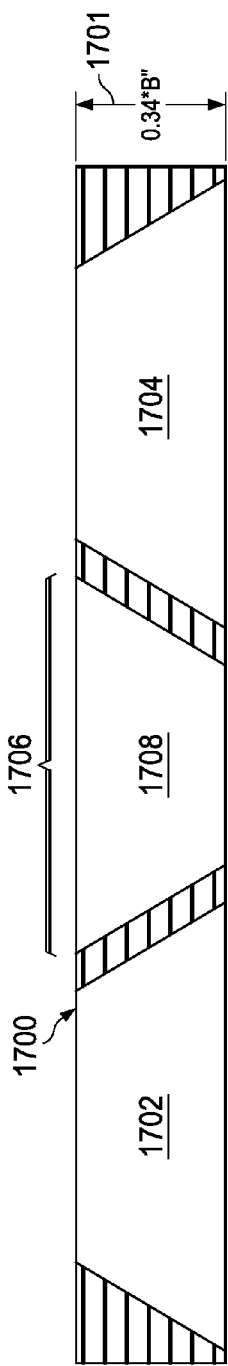

With reference now to FIGS. 15-17, illustrations of panels from which composite structures for noodles are formed are depicted in accordance with an illustrative embodiment. These composite structures may be cut to form a number of noodles, such as noodle 406 in FIG. 6.

Turning now to FIG. 15, panel 1500 is comprised of composite layers. Panel 1500 has height 1501. Cuts are made into panel 1500 to form composite structures 1502, 1504, and 1506. These composite structures have substantially the same shape and size. Composite structure 602 in FIG. 6 may be formed in a manner similar to the manner in which composite structures 1502, 1504, and 1506 are formed. Of course, additional composite structures may be cut from panel 1500.

In FIG. 16, panel 1600 is comprised of composite layers. Panel 1600 has height 1601. Cuts are made into panel 1600 to form composite structures 1602, 1604, and 1606. These composite structures have substantially the same shape and size. Composite structure 604 in FIG. 6 may be formed in a manner similar to the manner in which composite structures 1602, 1604, and 1606 are formed.

Additionally, in FIG. 17, panel 1700 is comprised of composite layers. Panel 1700 has height 1701. Cuts are made into panel 1700 to form composite structures 1702 and 1704. These composite structures have substantially the same shape and size. Composite structure 606 in FIG. 6 may be formed in a manner similar to the manner in which composite structures 1702 and 1704 are formed.

The composite structures formed in FIGS. 15, 16, and 17 may be stacked on top of each other to form noodles. In one illustrative example, composite structure 1502 may be stacked on top of composite structure 1602, which may be stacked on top of composite structure 1702 to form a noodle. These composite structures are stacked to form a noodle having a shape that substantially conforms to a particular channel in a composite elongate member.

As another example, composite structure 1504 may be stacked on top of composite structure 1604, which may be stacked on top of composite structure 1704 to form another noodle. This noodle has a substantially same size and shape as the noodle formed by stacking composite structures 1502, 1602, and 1702.

In other illustrative examples, other cuts may be made in other portions of panel 1700, such as portion 1706, to form other composite structures for the noodle. As one illustrative example, cuts may be made in panel 1700 to form composite structure 1708. Composite structure 1708 may be used in the same noodle as composite structures 1502, 1602, and 1702, or in a different noodle.

Figure 18:
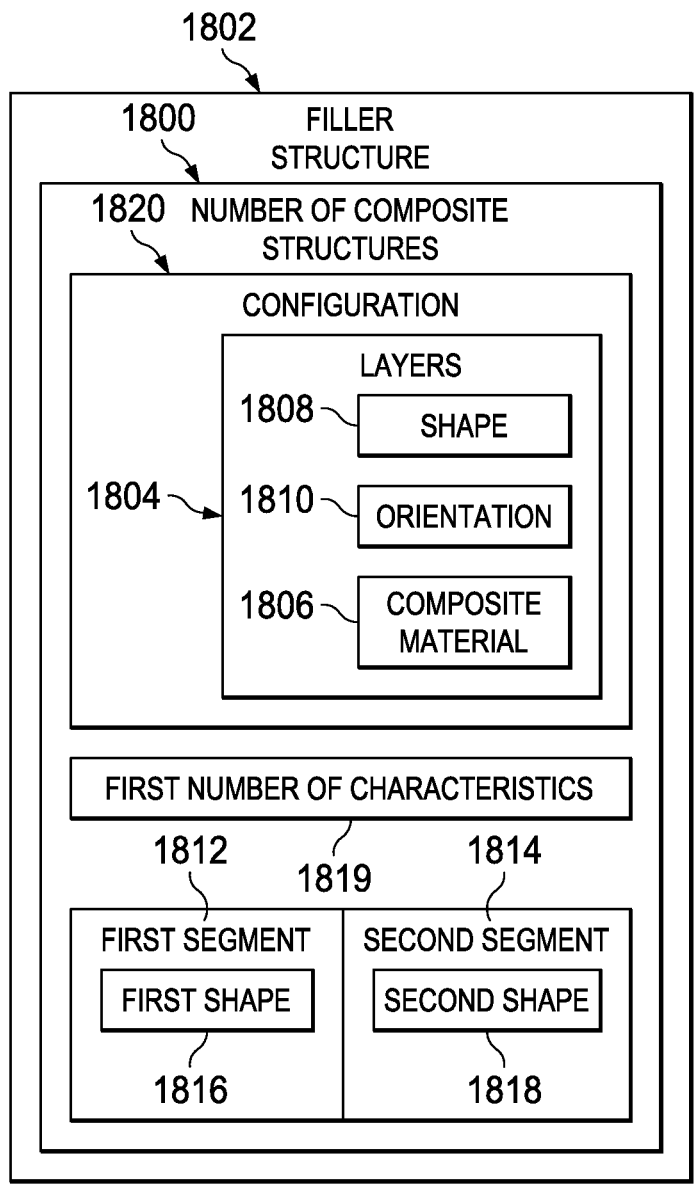
FIG. 18 is an illustration of a filler structure in the form of a block diagram in accordance with an illustrative embodiment.

With reference now to FIG. 18, an illustration of a filler structure in the form of a block diagram is depicted in accordance with an illustrative embodiment. In this illustrative example, number of composite structures 1800 is an example of one implementation for number of composite structures 304 in FIG. 3.

In this illustrative example, number of composite structures 1800 forms filler structure 1802 for channel 332 in FIG. 3 that is different from filler structure 336 in FIG. 3. Filler structure 1802 is another example of a noodle for channel 332 of composite elongate member 302 in FIG. 3.

In particular, number of composite structures 1800 may be placed into channel 332 of composite elongate member 302 to attach structure 306 to composite elongate member 302 in FIG. 3. More specifically, number of composite structures 1800 attaches a portion of surface 337 of structure 306 to the portions of first side 334 at first location 321 and second location 323 of second section 322 for composite elongate member 302 in FIG. 3.

As depicted in this example, number of composite structures 1800 is comprised of layers 1804 of composite material 1806. In this illustrative example, layers 1804 of composite material 1806 have shape 1808 and orientation 1810. Shape 1808 and orientation 1810 for number of composite structures 1800 are configured to increase capacity 356 of composite elongate member 302 to withstand forces 358 that may pull composite elongate member 302 away from structure 306 in FIG. 3.

As one illustrative example, orientation 1810 of layers 1804 of composite material 1806 may be a vertical orientation. In other words, layers 1804 of composite material 1806 may be orientated substantially perpendicular to surface 337 of structure 306 to increase capacity 356 of composite elongate member 302 from FIG. 3 to withstand forces 358 that pull composite elongate member 302 away from structure 306.

In this illustrative example, layers 1804 being oriented substantially perpendicular to surface 337 of structure 306 means that layers 1804 are oriented at an angle of about 90 degrees with respect to surface 337 of structure 306. In other words, layers 1804 are oriented substantially vertically with respect to surface 337 of structure 306 that may be substantially horizontal.

Additionally, number of composite structures 1800 has shape 1808 that substantially conforms to shape 333 of channel 332 in FIG. 3. In other words, layers 1804 of composite material 1806 may be formed with shape 1808 to substantially conform to shape 333 of channel 332 in FIG. 3.

Each of number of composite structures 304 may be a segment of filler structure 1802. For example, number of composite structures 1800 may comprise a number of segments that, when attached together, form filler structure 1802.

For example, number of composite structures 1800 may comprise a first segment, a second segment, and a set of intermediate segments located between the base segment and the top segment. As used herein, a "set of items" means zero or more items. For example, a set of intermediate segments may be an empty set or null set.

As one illustrative example, number of composite structures 1800 may comprise first segment 1812 and second segment 1814. First segment 1812 may have first shape 1816, and second segment 1814 may have second shape 1818. In these illustrative examples, first shape 1816 may be substantially symmetrical to second shape 1818. When placed together such that both first segment 1812 and second segment 1814 attach to surface 337 of structure 306 in FIG. 3, first shape 1816 for first segment 1812 and second shape 1818 for second segment 1814 may form shape 1808 for number of composite structures 1800.

In these illustrative examples, number of composite structures 1800 has first number of characteristics 1819 that substantially match second number of characteristics 354 for composite elongate member 302 in FIG. 3. First number of characteristics 1819 may include substantially the same characteristics as second number of characteristics 354. For example, first number of characteristics 1819 may comprise, without limitation, at least one of a coefficient of thermal expansion, a Young's modulus, and other suitable characteristics.

As one illustrative example, layers 1804 for number of composite structures 1800 may have configuration 1820. Configuration 1820 for layers 1804 is selected such that first number of characteristics 1819 for number of composite structures 1800 substantially matches second number of characteristics 354 for composite elongate member 302 in FIG. 3. For example, with configuration 1820, a value for a Young's modulus for number of composite structures 1800 may be within a desired range from a value for a Young's modulus for composite elongate member 302 in FIG. 3.

When first number of characteristics 1819 for number of composite structures 1800 and second number of characteristics 354 for composite elongate member 302 in FIG. 3 substantially match, capacity 356 of composite elongate member 302 to withstand forces 358 increases. Forces 358 are generated when pressure is applied to composite elongate member 302 and structure 306. For example, pressure may be applied to composite elongate member 302 and structure 306 when aircraft 301 is being operated.

In particular, when layers 1804 of composite material 1806 are oriented substantially perpendicular to surface 337 of composite elongate member 302 in FIG. 3, the number of inconsistencies in filler structure 1802 that form substantially parallel to surface 337 of composite elongate member 302 may be reduced. For example, delamination of layers 1804 and/or the growth of other inconsistencies substantially parallel to surface 337 of composite elongate member 302 may be substantially arrested.

The illustration of number of composite structures 1800 in FIG. 18 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment. For example, in some illustrative examples, number of composite structures 1800 may include segments in addition to first segment 1812 and second segment 1814.

Figure 19:
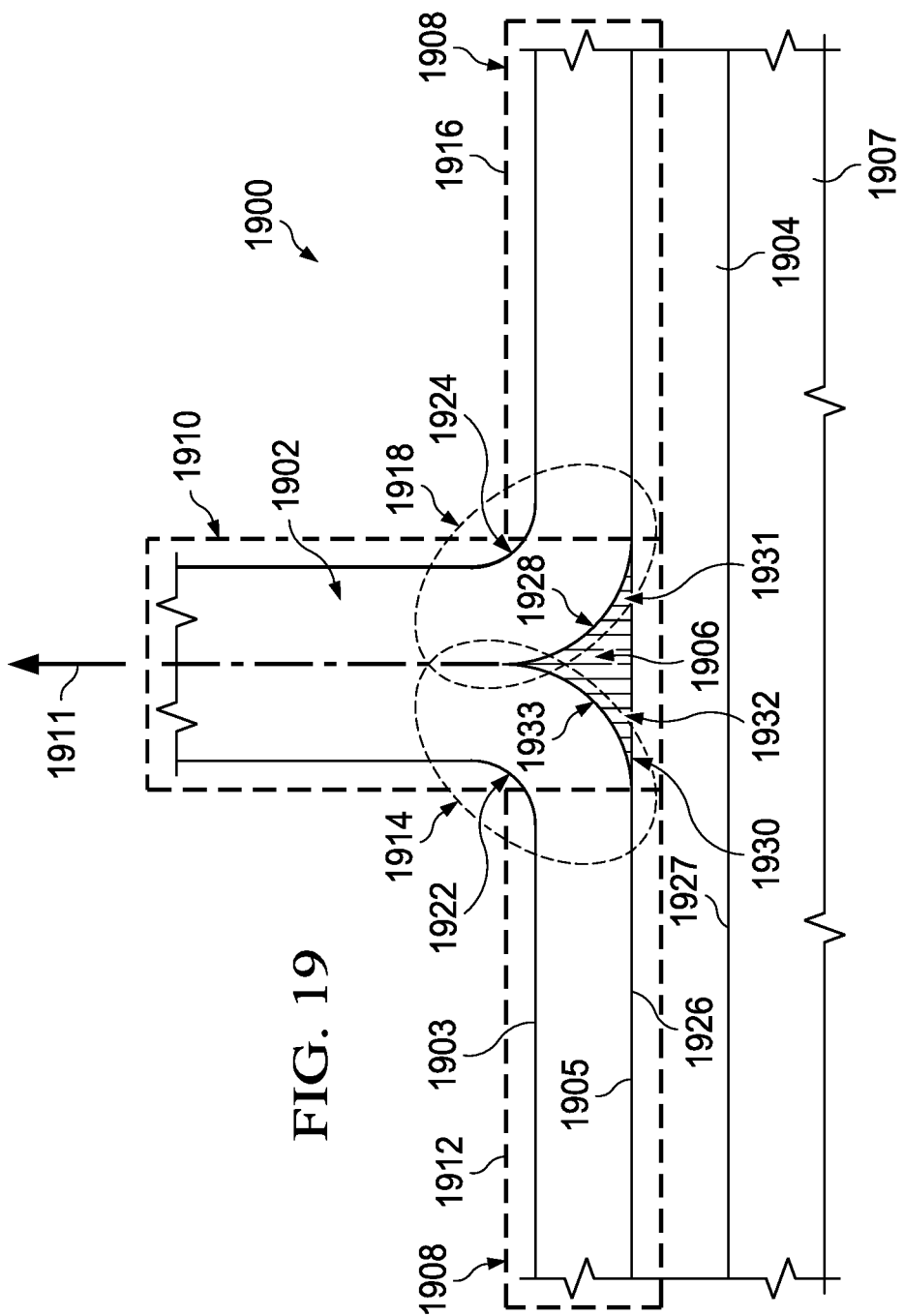
FIG. 19 is an illustration of a perspective view of a structural system in accordance with an illustrative embodiment.

With reference now to FIG. 19, an illustration of a perspective view of a structural system is depicted in accordance with an illustrative embodiment. In this illustrative example, structural system 1900 is an example of one implementation for structural system 300 shown in block form in FIG. 3 using number of composite structures 1800 in FIG. 18. In particular, structural system 1900 includes stringer 1902, base charge 1904, skin 1907, and noodle 1906. Stringer 1902 is an example of one implementation for composite elongate member 302 in FIG. 3. Base charge 1904 is an example of one implementation for structure 306 shown in block form in FIG. 3, and noodle 1906 is an example of one implementation for filler structure 1802 in FIG. 18.

In this illustrative example, stringer 1902 is a blade stringer. Stringer 1902 has first side 1903 and second side 1905. Further, stringer 1902 has first section 1908 and second section 1910. First section 1908 and second section 1910 are part of the same structure in this example. As depicted, first section 1908 is a discontinuous section.

Second section 1910 is positioned relative to first section 1908 such that second section 1910 extends away from first section 1908 in the direction of arrow 1911. Arrow 1911 has a direction that is substantially perpendicular to first section 1908.

In this depicted example, second section 1910 meets first portion 1912 of first section 1908 at first location 1914 of second section 1910 and second portion 1916 of first section 1908 at second location 1918 of second section 1910. First location 1914 has first curved shape 1922. Second location 1918 has second curved shape 1924.

In this illustrative example, base charge 1904 is attached to first side 1903 of stringer 1902. In particular, first surface 1926 of base charge 1904 contacts first side 1903 of first section 1908. Skin 1907 is attached to second surface 1927 of base charge 1904. As depicted, first surface 1926 does not come into contact with first side 1903 of second section 1910.

Noodle 1906 is located in channel 1928. Noodle 1906 comprises number of composite structures 1931. Number of composite structures 1931 is an illustrative example of one implementation for number of composite structures 1800 shown in block form in FIG. 18. Number of composite structures 1931 is comprised of composite layers 1932. Composite layers 1932 are layers of composite material, such as layers 1804 of composite material 1806 shown in block form in FIG. 18.

The configuration of composite layers 1932 is selected such that shape 1933 of noodle 1906 substantially conforms to shape 1930 of channel 1928. Further, with noodle 1906, a capacity for stringer 1902 to withstand forces that pull stringer 1902 away from base charge 1904 and/or skin 1907 is increased as compared to when noodle 1906 is absent or when a different type of noodle is present. These forces are in the direction of arrow 1911.

As depicted, composite layers 1932 for noodle 1906 may be oriented substantially perpendicular to first side 1903 of first section 1908 and first surface 1926 of base charge 1904. In other words, composite layers 1932 are oriented at an angle of about 90 degrees with respect to first surface 1926 of base charge 1904. More specifically, composite layers 1932 are oriented in the direction of arrow 1911 in this depicted example.

Additionally, in this illustrative example, adhesive and/or some other suitable type of material may be used to fill in any gaps or spaces between noodle 1906 and first side 1903 of stringer 1902 at first location 1914 and second location 1918. In this manner, gaps or spaces in channel 1928 may not be present when stringer 1902, base charge 1904, and noodle 1906 are attached together.

Figure 20:
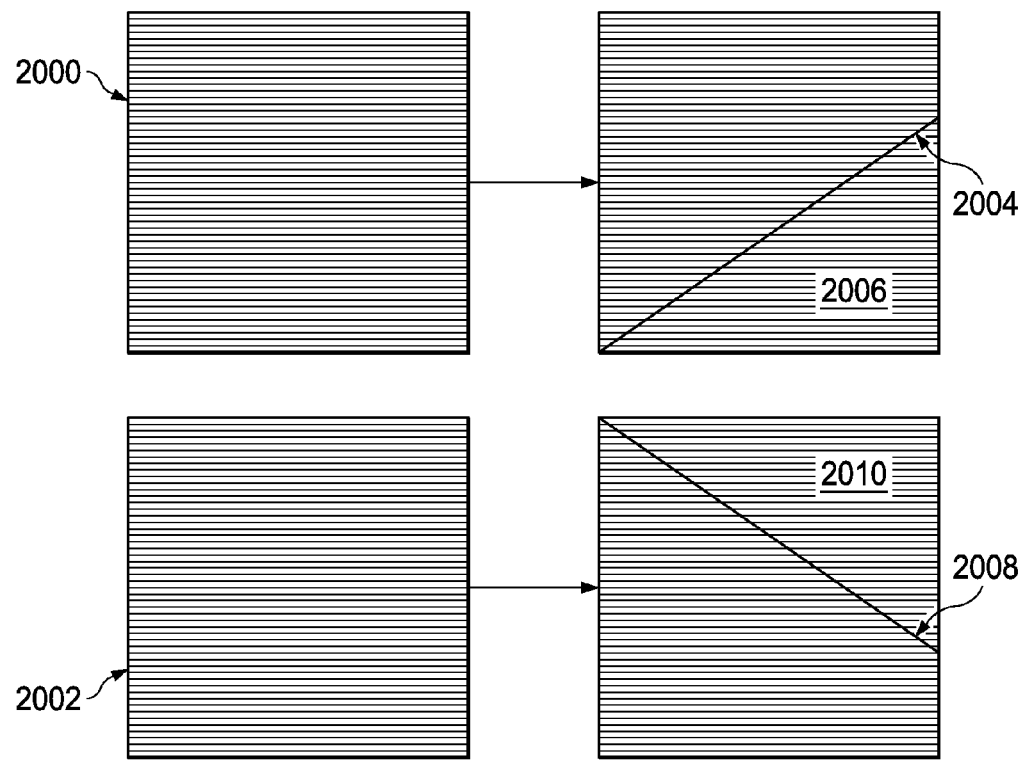
FIG. 20 is an illustration of panels from which composite structures for noodles are formed in accordance with an illustrative embodiment.

With reference now to FIG. 20, an illustration of panels from which composite structures for noodles are formed is depicted in accordance with an illustrative embodiment. These composite structures may be cut to form a number of composite structures, such as number of composite structures 1800 shown in block form in FIG. 18. In particular, these composite structures may be cut to form a noodle, such as noodle 1906 in FIG. 19.

As depicted, panel 2000 and panel 2002 are comprised of composite layers. Cut 2004 is made into panel 2000 to form composite structure 2006. Cut 2008 is made into panel 2002 to form composite structure 2010. These composite structures have substantially the same shape and size. The leftover portions of panel 2000 and panel 2002 may be used to form other composite structures, depending on the implementation.

Figure 21:
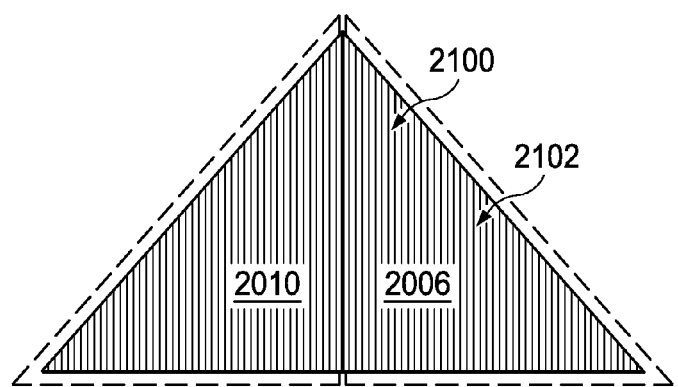
FIG. 21 is an illustration of a laminate for a noodle in accordance with an illustrative embodiment.

With reference now to FIG. 21, an illustration of a laminate for a noodle is depicted in accordance with an illustrative embodiment. In this illustrative example, composite structure 2006 and composite structure 2010 from FIG. 20 may be attached together to form laminate 2100 with shape 2102. In particular, composite structure 2006 and composite structure 2010 are rotated to form laminate 2100 with shape 2102. Laminate 2100 may be used to form a noodle for a composite elongate member in the form of a stringer.

Shape 2102 for laminate 2100 may be larger than a shape for the channel into which the final noodle is to be placed. In particular, shape 2102 for laminate 2100 is configured such that after curing, laminate 2100 may have a final shape that substantially conforms to the shape of the channel in the stringer. Laminate 2100 may be cured by applying heat and/or pressure to laminate 2100 to form the noodle for the stringer.

Of course, in other illustrative examples, laminate 2100 having shape 2102 may be formed from a single panel by making two cuts at about 45 degrees with respect to the surface of the panel and with an angle of about 90 degrees between the two cuts.

Figure 22:
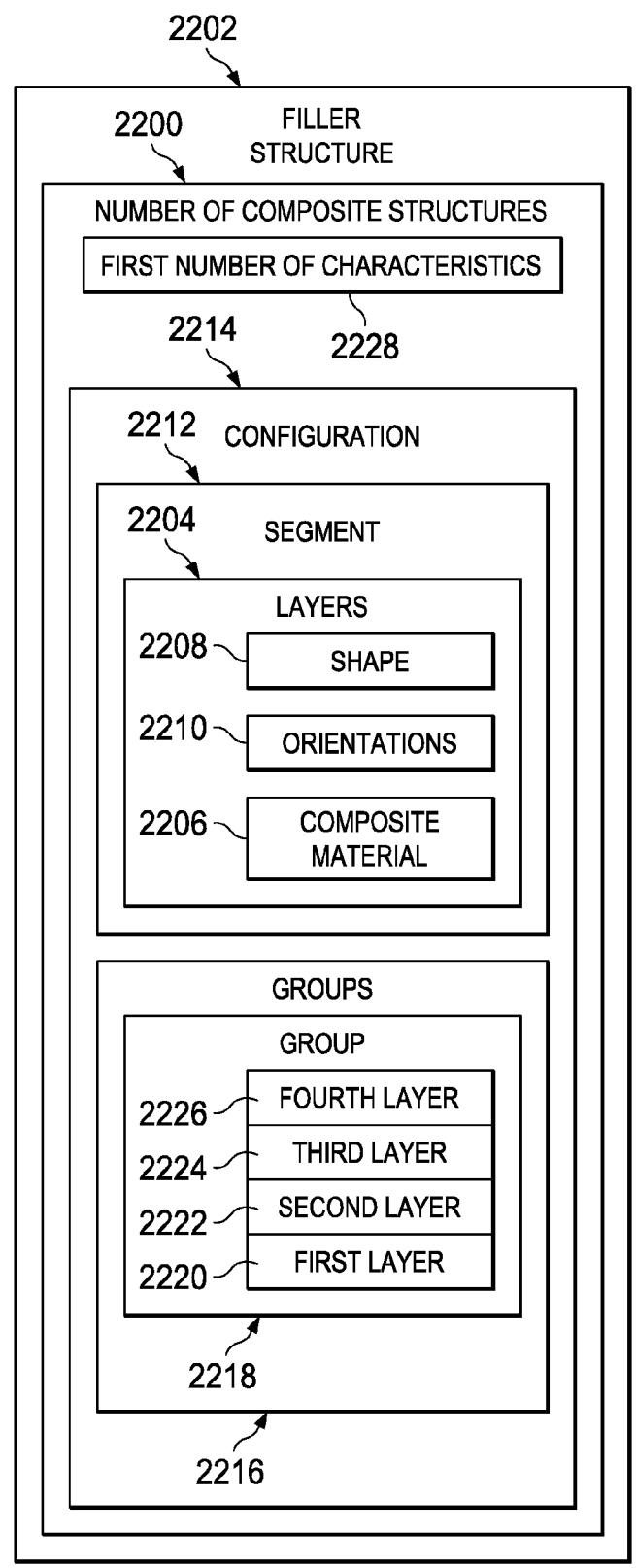
FIG. 22 is an illustration of a filler structure in the form of a block diagram in accordance with an illustrative embodiment.

With reference now to FIG. 22, an illustration of a filler structure in the form of a block diagram is depicted in accordance with an illustrative embodiment. In this illustrative example, number of composite structures 2200 is an example of one implementation for number of composite structures 304 shown in block form in FIG. 3.

In this illustrative example, number of composite structures 2200 forms filler structure 2202 for channel 332 shown in block form in FIG. 3. Filler structure 2202 is another example of a noodle for channel 332 of composite elongate member 302 shown in block form in FIG. 3.

In particular, number of composite structures 2200 may be placed into channel 332 of composite elongate member 302 to attach structure 306 to composite elongate member 302 shown in block form in FIG. 3. More specifically, number of composite structures 2200 attaches a portion of surface 337 of structure 306 to the portions of first side 334 at first location 321 and second location 323 of second section 322 for composite elongate member 302 shown in block form in FIG. 3.

As depicted in this example, number of composite structures 2200 is comprised of layers 2204 of composite material 2206. In this illustrative example, layers 2204 of composite material 2206 have shape 2208. Shape 2208 for number of composite structures 2200 is configured to increase capacity 356 of composite elongate member 302 to withstand forces 358 that may pull composite elongate member 302 away from structure 306 shown in block form in FIG. 3. In particular, number of composite structures 2200 has shape 2208 that substantially conforms to shape 333 of channel 332 shown in block form in FIG. 3. In other words, layers 2204 of composite material 2206 may be formed with shape 2208 to substantially conform to shape 333 of channel 332 shown in block form in FIG. 3.

In this illustrative example, each of number of composite structures 2200 may be a segment of filler structure 2202. For example, number of composite structures 2200 may comprise a number of segments that, when attached together, form filler structure 2202. In one illustrative example, number of composite structures 2200 may comprise only segment 2212 comprising layers 2204 of composite material 2206.

Layers 2204 of composite material 2206 in segment 2212 have different orientations 2210 with respect to axis 357 through composite elongate member 302 shown in block form in FIG. 3. Orientations 2210 of layers 2204 of composite material 2206 in number of composite structures 2200 may be selected to increase capacity 356 of composite elongate member 302 to withstand forces 358 that may pull composite elongate member 302 away from structure 306 shown in block form in FIG. 3.

For example, layers 2204 may be laid up with configuration 2214. Configuration 2214 for layers 2204 may comprise groups 2216 of layers 2204. As used herein, a group of layers is two or more layers. As one illustrative example, layers 2204 may be formed into groups 2216 of layers 2204 in which each group in groups 2216 comprises two layers. These two layers may have different orientations 2210.

Group 2218 is an example of one of groups 2216. In one illustrative example, group 2218 comprises first layer 2220 and second layer 2222. Second layer 2222 may be laid up on top of first layer 2220. First layer 2220 may comprise fibers that are arranged at an angle of about zero degrees with respect to axis 357 through composite elongate member 302 shown in block form in FIG. 3. Further, second layer 2222 may comprise fibers that are arranged at an angle selected from one of about 45 degrees with respect to axis 357 and about 90 degrees with respect to axis 357.

In configuration 2214 for layers 2204, all of the groups in groups 2216 may have two layers arranged in substantially the same manner as first layer 2220 and second layer 2222 for group 2218. In particular, the angle at which the fibers for second layer 2222 are arranged in the different groups in groups 2216 may be alternated between about 45 degrees with respect to axis 357 and about 90 degrees with respect to axis 357 through composite elongate member 302 shown in block form in FIG. 3. In other words, two adjacent groups in groups 2216 may not have second layer 2222 with fibers having the same angle with respect to axis 357.

In another illustrative example, group 2218 may comprise layers in addition to first layer 2220 and second layer 2222. For example, group 2218 also may include third layer 2224 and fourth layer 2226. Second layer 2222 may be laid up on first layer 2220. Third layer 2224 may be laid up on second layer 2222. Fourth layer 2226 may be laid up on third layer 2224.

When group 2218 comprises four layers, first layer 2220 and fourth layer 2226 may comprise fibers that are arranged at an angle of about zero degrees with respect to axis 357 through composite elongate member 302 in FIG. 3. Second layer 2222 and third layer 2224 may comprise fibers that are arranged at an angle selected from one of about 45 degrees with respect to axis 357 and about 90 degrees with respect to axis 357. In this manner, second layer 2222 and third layer 2224 may be "sandwiched" between first layer 2220 and fourth layer 2226 having fibers arranged at the angle of about zero degrees with respect to axis 357 through composite elongate member 302.

In yet another illustrative example, group 2218 may include three layers. These three layers may include, for example, first layer 2220, second layer 2222, and third layer 2224. In this example, first layer 2220 may comprise fibers that are arranged at an angle of about zero degrees with respect to axis 357 through composite elongate member 302 shown in block form in FIG. 3. Further, each of second layer 2222 and third layer 2224 may comprise fibers that are arranged at an angle selected from a range between about 45 degrees and about 50 degrees with respect to axis 357.

In this manner, group 2218 may not include any layers having fibers arranged at an angle of about 90 degrees with respect to axis 357 in this illustrative example. Of course, in other illustrative examples, group 2218 may include two layers, four layers, or some other number of layers in which a layer having fibers arranged at an angle of about 90 degrees with respect to axis 357 is not present. Each layer in group 2218 may comprise fibers arranged at an angle of about zero degrees with respect to axis 357 or an angle selected between a range from about 45 degrees to about 50 degrees with respect to axis 357.

With this type of configuration 2214 in which groups 2216 do not include any layers having fibers arranged at an angle of about 90 degrees with respect to axis 357, capacity 356 of composite elongate member 302 to withstand forces 358 that may pull composite elongate member 302 away from structure 306 shown in block form in FIG. 3 may be increased to a desired capacity. Further, this type of configuration 2214 may provide a desired thermal expansion for number of composite structures 2200.

Additionally, manufacturing of number of composite structures 2200 may be easier when orientations 2210 for layers 2204 do not include any layers having fibers arranged at an angle of about 90 degrees with respect to axis 357. In particular, number of composite structures 2200 may be formed more easily, because the stiffness of the layers in the forming direction may be reduced as compared to the stiffness of a layer having fibers arranged at an angle of about 90 degrees with respect to axis 357. In particular, a layer comprised of fibers arranged at an angle of about 90 degrees with respect to axis 357 may have an increased stiffness in a direction perpendicular to axis 357 as compared to a layer comprised of fibers arranged at an angle selected between a range of about 45 degrees to about 50 degrees.

Further, when each group in groups 2216 has the same configuration for the layers in each group, manufacturing of number of composite structures 2200 may be easier and performed with a desired level of accuracy as compared to the groups in groups 2216 having different configurations. In other words, the possibility of having a group in groups 2216 with orientations for the layers in the group outside of selected tolerances may be reduced.

Groups 2216 of layers 2204 may be formed as a laminate that has a shape larger than shape 333 of channel 332 shown in block form in FIG. 3. For example, layers 2204 for the different groups in groups 2216 that are laid up to form the laminate may be wider than shape 333 of channel 332 in a direction substantially perpendicular to axis 357 through composite elongate member 302. The shape for the laminate is formed such that after curing of the laminate to form filler structure 2202, filler structure 2202 has shape 2208 that substantially conforms to shape 333 of channel 332 shown in block form in FIG. 3.

Further, in this illustrative example, layers 2204 may have different widths, depending on the implementation. As one illustrative example, layers 2204 may have widths that decrease in value from a base of filler structure 2202 to a top of filler structure 2202. In other words, layers 2204 that are closer to structure 306 when filler structure 2202 is placed in channel 332 in FIG. 3 may be wider as compared to layers 2204 that are further away from structure 306.

In this manner, layers 2204 may have widths that form shape 2208 similar to shape 333 of channel 332 shown in block form in FIG. 3. In particular, these widths may be selected such that the widths of layers 2204 are wider than shape 333 of channel 332 prior to curing of layers 2204 to form filler structure 2202. As a result, prior to curing, layers 2204 may have shape 2208 with a size that is slightly larger than the size of shape 333 of channel 332. When layers 2204 are cured to form filler structure 2202, the widths of layers 2204 may be reduced such that shape 2208 of filler structure 2202 has a size that substantially conforms to shape 333 of channel 332.

In these illustrative examples, number of composite structures 2200 has first number of characteristics 2228 that substantially matches second number of characteristics 354 for composite elongate member 302 shown in block form in FIG. 3. First number of characteristics 2228 may include substantially the same characteristics as second number of characteristics 354. For example, first number of characteristics 2228 may comprise, without limitation, at least one of a coefficient of thermal expansion, a Young's modulus, and other suitable characteristics.

In this illustrative example, configuration 2214 for groups 2216 of layers 2204 is selected such that first number of characteristics 2228 for number of composite structures 2200 substantially matches second number of characteristics 354 for composite elongate member 302 in FIG. 3. For example, with configuration 2214, a value for a Young's modulus for number of composite structures 2200 may be within a desired range from a value for a Young's modulus for composite elongate member 302 shown in block form in FIG. 3.

When first number of characteristics 2228 for number of composite structures 2200 and second number of characteristics 354 for composite elongate member 302 shown in block form in FIG. 3 substantially match, capacity 356 of composite elongate member 302 to withstand forces 358 increases.

The illustration of number of composite structures 2200 in FIG. 22 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, fewer or more layers than the ones described may be present in group 2218. Further, in still other illustrative examples, configuration 2214 may include segments in addition to or in place of segment 2212. For example, number of composite structures 2200 may include three composite structures that take the form of three segments for filler structure 2202.

Figure 23:
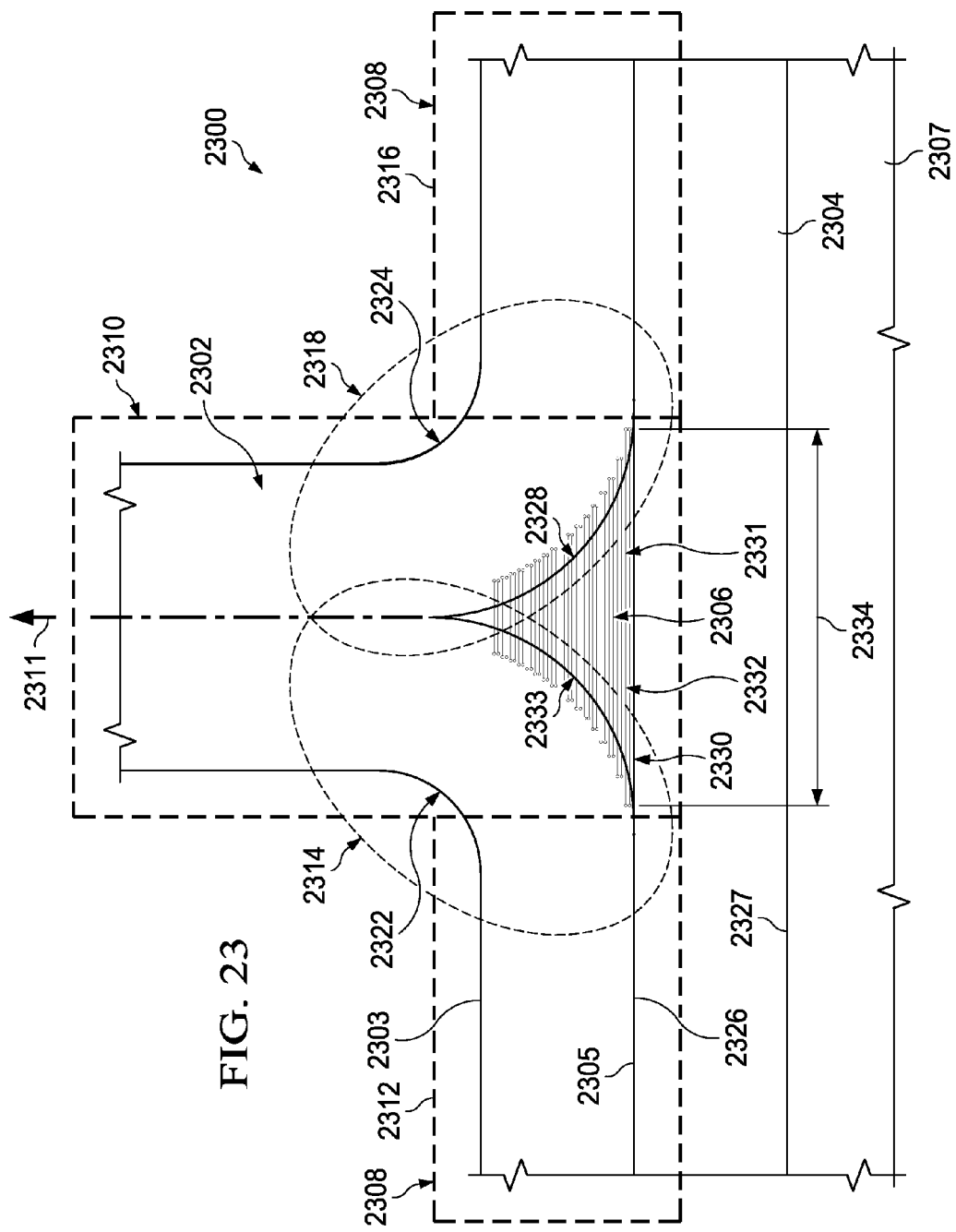
FIG. 23 is an illustration of a front view of a structural system in accordance with an illustrative embodiment.

With reference now to FIG. 23, an illustration of a front view of a structural system is depicted in accordance with an illustrative embodiment. In this illustrative example, structural system 2300 is an example of one implementation for structural system 300 in FIG. 3 using number of composite structures 2200 in FIG. 22. In particular, structural system 2300 includes stringer 2302, base charge 2304, skin 2307, and noodle 2306. Stringer 2302 is an example of one implementation for composite elongate member 302 shown in block form in FIG. 3. Base charge 2304 is an example of one implementation for structure 306 in FIG. 3, and noodle 2306 is an example of one implementation for filler structure 2202 in FIG. 22.

In this illustrative example, stringer 2302 is a blade stringer. Stringer 2302 has first side 2303 and second side 2305. Further, stringer 2302 has first section 2308 and second section 2310. First section 2308 and second section 2310 are part of the same structure in this example. As depicted, first section 2308 is a discontinuous section.

Second section 2310 is positioned relative to first section 2308 such that second section 2310 extends away from first section 2308 in the direction of arrow 2311. Arrow 2311 has a direction that is substantially perpendicular to first section 2308.

In this depicted example, second section 2310 meets first portion 2312 of first section 2308 at first location 2314 of second section 2310 and second portion 2316 of first section 2308 at second location 2318 of second section 2310. First location 2314 has first curved shape 2322. Second location 2318 has second curved shape 2324.

In this illustrative example, base charge 2304 is attached to first side 2303 of stringer 2302. In particular, first surface 2326 of base charge 2304 contacts first side 2303 of first section 2308. Skin 2307 is attached to second surface 2327 of base charge 2304. As depicted, first surface 2326 does not come into contact with first side 2303 of second section 2310.

Noodle 2306 may be inserted into channel 2328. As depicted, noodle 2306 comprises composite structure 2331. Composite structure 2331 is an example of one implementation for number of composite structures 2200 in FIG. 22. Composite structure 2331 takes the form of one segment in this depicted example. Composite structure 2331 is comprised of composite layers 2332. Composite layers 2332 are layers of composite material, such as layers 2204 of composite material 2206 in FIG. 22.

As illustrated, composite layers 2332 may have widths 2334 that are wider than shape 2330 of channel 2328. However, widths 2334 may be selected such that composite layers 2332 may shrink to form shape 2333 with a size that substantially conforms to the size of shape 2330 of channel 2328. In particular, the configuration of composite layers 2332 is selected such that shape 2333 of noodle 2306 substantially conforms to shape 2330 of channel 2328 after noodle 2306 has been cured.

Further, with noodle 2306, a capacity for stringer 2302 to withstand forces that pull stringer 2302 away from base charge 2304 and/or skin 2307 is increased as compared to when noodle 2306 is absent or when a different type of noodle is present. These forces are in the direction of arrow 2311.

In this illustrative example, composite layers 2332 for noodle 2306 may have different orientations with respect to an axis (not shown) through stringer 2302. This axis (not shown) may be through the page and substantially perpendicular to arrow 2311. In this illustrative example, composite layers 2332 include 34 layers.

Additionally, in this illustrative example, adhesive and/or some other suitable type of material may be used to fill in any gaps or spaces between noodle 2306 and first side 2303 of stringer 2302 at first location 2314 and second location 2318. In this manner, gaps or spaces in channel 2328 may not be present when stringer 2302, base charge 2304, and noodle 2306 are attached together.

With reference now to FIGS. 24A and 24B, an illustration of a table of widths and orientation angles for composite layers in a noodle is depicted in accordance with an illustrative embodiment. In this illustrative example, table 2400 includes composite layers 2402, orientation angles 2404, and widths 2406.

As depicted, composite layers 2402 identify the different composite layers in composite layers 2332 within noodle 2306 in FIG. 23. Orientation angles 2404 identify the angles in which the fibers for the different composite layers in composite layers 2332 are arranged with respect to the axis (not shown in FIG. 23) through stringer 2302. Further, widths 2406 identify the different widths in widths 2334 for the different composite layers in composite layers 2332 in FIG. 23.

With reference now to FIGS. 25A and 25B, an illustration of another table of widths and orientation angles for composite layers in a noodle is depicted in accordance with an illustrative embodiment. In this illustrative example, table 2500 includes composite layers 2502, orientation angles 2504, and widths 2506.

As depicted, composite layers 2502 identify the different composite layers in composite layers 2332 within noodle 2306 in FIG. 23. Orientation angles 2504 identify the angles in which the fibers for the different composite layers in composite layers 2332 are arranged with respect to the axis (not shown in FIG. 23) through stringer 2302. Further, widths 2506 identify the different widths in widths 2334 for the different composite layers in composite layers 2332 in FIG. 23.

Figure 26:
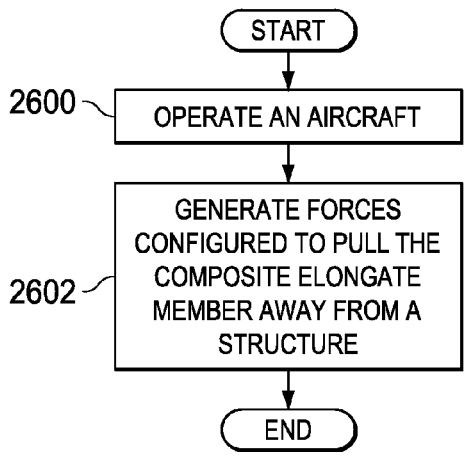
FIG. 26 is an illustration of a flowchart of a process for increasing a pull-off capacity for a composite elongate member in accordance with an illustrative embodiment.

With reference now to FIG. 26, an illustration of a flowchart of a process for increasing a pull-off capacity for a composite elongate member is depicted in accordance with an illustrative embodiment. The process illustrated in FIG. 26 may be implemented to increase a pull-off capacity for composite elongate member 302 in FIG. 3.

The process begins by operating an aircraft (operation 2600). In particular, in operation 2600, the process applies a pressure to the composite elongate member and a structure attached to a side of the composite elongate member. The composite elongate member may be, for example, a stringer. The structure may be, for example, a skin panel.

In response to operation of the aircraft, the process generates forces configured to pull the composite elongate member away from a structure (operation 2602), with the process terminating thereafter. The forces are in a direction substantially perpendicular to a surface of the structure. In this illustrative example, a channel extends along a length of the composite elongate member on the side of the composite elongate member attached to the structure.

A number of composite structures is configured to attach a portion of the side of the composite elongate member to the structure such that a capacity of the composite elongate member to withstand the forces that pull the composite elongate member away from the structure is increased. The capacity of the composite elongate member to withstand the forces that pull the composite elongate member away from the structure is the pull-off capacity for the composite elongate member.

In this illustrative example, the number of composite structures that attaches the portion of the side of the composite elongate member to the structure may be selected from a number of different configurations. For example, the number of composite structures may have configuration 351 for number of composite structures 304 in FIG. 3, configuration 1820 for number of composite structures 1800 in FIG. 18, or configuration 2214 for number of composite structures 2200 in FIG. 22.

Figure 27:
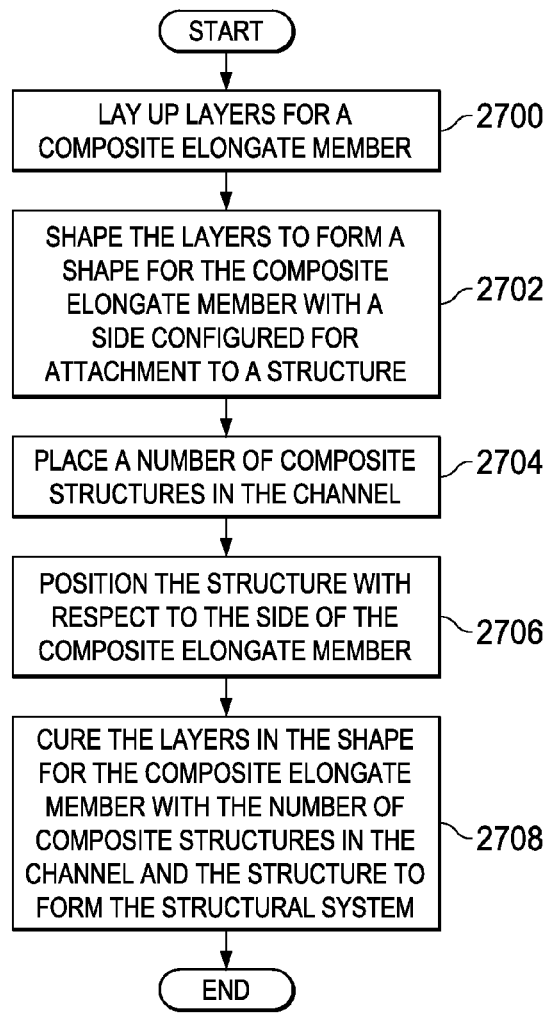
FIG. 27 is an illustration of a flowchart of a process for forming a structural system in accordance with an illustrative embodiment.

With reference now to FIG. 27, an illustration of a flowchart of a process for forming a structural system is depicted in accordance with an illustrative embodiment. The process illustrated in FIG. 27 may be implemented to form structural system 300 in FIG. 3.

The process begins by laying up layers for a composite elongate member (operation 2700). These layers may be, for example, layers of composite material. The composite elongate member may be, for example, a stringer, a stiffener, or some other suitable type of composite elongate member.

The process then shapes the layers to form a shape for the composite elongate member with a side configured for attachment to a structure (operation 2702). Operation 2702 may be performed by, for example, heating the layers to form the shape for the composite elongate member. The structure may be, for example, a skin panel, a base charge, and/or some other structure having a substantially planar surface. A channel extending along a length of the composite elongate member is present on the side configured for attachment to the structure.

Thereafter, the process places a number of composite structures in the channel (operation 2704). In operation 2704, the number of composite structures may have configuration 351 for number of composite structures 304 in FIG. 3, configuration 1820 for number of composite structures 1800 in FIG. 18, or configuration 2214 for number of composite structures 2200 in FIG. 22.

The number of composite structures forms a filler structure that is configured to attach a portion of the side of the composite elongate member to the structure. The number of composite structures increases a capacity of the composite elongate member to withstand forces that pull the composite elongate member away from the structure.

The process then positions the structure with respect to the side of the composite elongate member (operation 2706). For example, in operation 2706, the structure may be placed over the composite elongate member such that a surface of the structure directly contacts at least a portion of the side of the composite structure. The process then cures the layers in the shape for the composite elongate member with the number of composite structures in the channel and the structure to form the structural system (operation 2708), with the process terminating thereafter.

Figure 28:
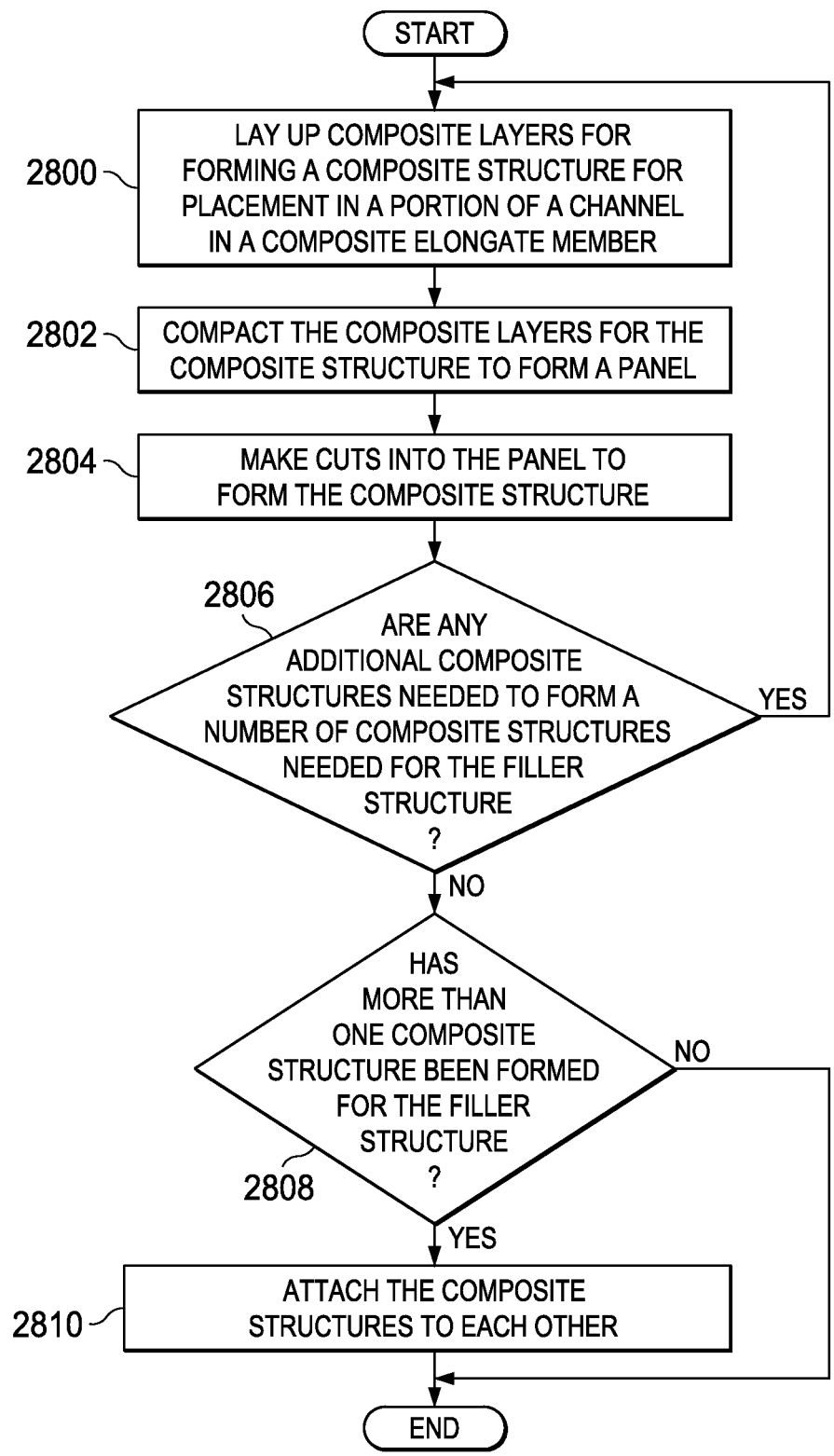
FIG. 28 is an illustration of a flowchart of a process for forming a filler structure in accordance with an illustrative embodiment.

With reference now to FIG. 28, an illustration of a flowchart of a process for forming a filler structure is depicted in accordance with an illustrative embodiment. The process illustrated in FIG. 28 may be implemented to form filler structure 336 in FIG. 3.

The process lays up composite layers for forming a composite structure for placement in a portion of a channel in a composite elongate member (operation 2800). The composite structure is for a filler structure to be placed in the channel of the composite elongate member. The composite layers for the composite structure are then compacted to form a panel (operation 2802). This compaction is performed by applying pressure to the composite layers to form the panel. The panel has a height that is substantially the height desired for the composite structure.

Thereafter, the process makes cuts into the panel to form the composite structure (operation 2804). In operation 2804, the cuts may be made at angles selected to form the composite structure having a size and shape that substantially conforms to the corresponding portion of the channel. In some illustrative examples, the cuts may be made such that the size and shape of the composite structure reduces after curing to a size and shape that substantially conforms to the corresponding portion of the channel.

The process then determines whether any additional composite structures are needed to form a number of composite structures needed for the filler structure (operation 2806). If additional composite structures are not needed, the process determines whether more than one composite structure has been formed for the filler structure (operation 2808).

If more than one composite structure has not been formed for the filler structure, the process terminates. If more than one composite structure has been formed, the process attaches the composite structures to each other (operation 2810), with the process terminating thereafter. In operation 2810, the composite structures may be attached to each other in a stacked form, side by side, and/or in some other suitable manner such that an overall shape for the composite structures substantially conforms to the shape of the channel in the composite elongate member.

With reference again to operation 2806, if additional composite structures are needed for the filler structure, the process returns to operation 2800 as described above to form a new composite structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step.

In some alternative implementations of an illustrative embodiment, the function or functions noted in the block may occur out of the order noted in the figures. For example, in some cases, two blocks shown in succession may be executed substantially concurrently or the blocks may sometimes be executed in the reverse order, depending upon the functionality involved. Also, other blocks may be added in addition to the illustrated blocks in a flowchart or block diagram.

Thus, the different illustrative embodiments provide a stringer with an increased capacity to withstand forces that may pull the stringer away from another structure to which the stringer is attached. In one illustrative embodiment, a structural system comprises a composite elongate member, a number of composite structures, and a structure. The composite elongate member has a side configured for attachment to the structure and a channel on the side of the composite elongate member. The channel extends along a length of the composite elongate member. The number of composite structures is configured for placement in the channel. Further, the number of composite structures is configured to attach a portion of the side of the composite elongate member to the structure. The number of composite structures is configured to increase a capacity of the composite elongate member to withstand forces that pull the composite elongate member away from the structure.

In another illustrative embodiment, an apparatus comprises a composite elongate member, a channel, and a number of composite structures. The composite elongate member has a side configured for attachment to a structure. The channel is on the side and extends along a length of the composite elongate member. The number of composite structures is configured for placement in the channel and configured to attach a portion of the side of the composite elongate member to the structure. The number of composite structures has layers oriented substantially perpendicular to a surface of the structure configured to increase a capacity of the composite elongate member to withstand forces that pull the composite elongate member away from the structure.

In yet another illustrative embodiment, an apparatus comprises a composite elongate member, a channel, and a number of composite structures. The composite elongate member has a side configured for attachment to a structure. The channel is on the side and extends along a length of the composite elongate member. The number of composite structures is configured for placement in the channel and configured to attach a portion of the side of the composite elongate member to the structure.

In this illustrative embodiment, a composite structure in the number of composite structures comprises layers having different orientations selected to increase a capacity of the composite elongate member to withstand forces that pull the composite elongate member away from the structure. The composite structure may comprise groups of the layers that are laid up to form the composite structure.

As one specific example, a group in the groups of the layers may have a first layer in which first fibers in the first layers are arranged at an angle of about zero degrees with respect to an axis through the composite elongate member and a second layer in which second fibers in the second layer are arranged at an angle selected from one of about 45 degrees with respect to the axis through the composite elongate member and about 90 degrees with respect to the axis through the composite elongate member.

As another specific example, each layer in a group in the groups of the layers may comprise fibers arranged at an angle of about zero degrees with respect to the axis through the composite elongate member or an angle selected from a range between about 45 degrees to about 50 degrees with respect to the axis through the composite elongate member. In this specific example, a group in the groups of layers may not include any layer having fibers arranged at an angle of about 90 degrees with respect to the axis through the composite elongate member.

In this manner, the different illustrative embodiments provide a structural system that allows an increased number of intermediate ribs as compared to shear-tied ribs to be used in the wing of an aircraft. Intermediate ribs have a reduced weight as compared to shear-tied ribs. With stringers having an increased capacity to withstand forces that may pull the stringers away from a skin panel to which the stringers are attached, intermediate ribs may be used in addition to and/or in place of shear-tied ribs in a wing to reduce the weight of the wing.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a composite elongate member (302) having a side configured for attachment to a surface (337) of a structure (306);
   a channel (332) on the side extending along a length of the composite elongate member (302); and
   a number of composite structures (304) configured for placement in the channel (332) and configured to attach a portion of the side of the composite elongate member (302) to the structure (306), wherein a composite structure (306) in the number of composite structures (304) comprises layers (2204) having different orientations (2210) selected to increase a capacity (356) of the composite elongate member (302) to withstand forces (358) that pull the composite elongate member (302) away from the structure (306), the number of composite structures comprising a top segment configured to contact an apical portion of the channel.

2. The apparatus of claim 1, wherein the number of composite structures (304) has a shape (316) that substantially conforms to the shape (316) of the channel (332).

3. The apparatus of claim 1, wherein the number of composite structures (304) comprises:
   a first composite structure; and
   a second composite structure, wherein the first composite structure has a first shape (1816) that is symmetrical to a second shape (1818) for the second composite structure.

4. The apparatus of claim 1, wherein the number of composite structures (304) has a first number of characteristics (352) that substantially matches a second number of characteristics (354) for the composite elongate member (302) such that the capacity (356) of the composite elongate member (302) to withstand the forces (358) that pull the composite elongate member (302) away from the structure (306) increases.

5. The apparatus of claim 4, wherein the first number of characteristics (352) and the second number of characteristics (354) comprise at least one of a coefficient of thermal expansion and a Young's modulus.

6. The apparatus of claim 5, wherein the number of composite structures (304) comprises layers (2204) having a configuration (351) that results in a value for a first Young's modulus for the number of composite structures (304) that is within a desired range from a value for a second Young's modulus for the composite elongate member (302).

7. The apparatus of claim 1, wherein the composite structure (306) comprises groups (2214) of the layers (2204) that are laid up to form the composite structure (306).

8. The apparatus of claim 7, wherein a group (2218) in the groups (2214) of the layers (2204) has a first layer (2220) in which first fibers in the first layer (2220) are arranged at an angle of about zero degrees with respect to an axis (357) through the composite elongate member (302) and a second layer (2222) in which second fibers in the second layer (2222) are arranged at an angle selected from one of about 45 degrees with respect to the axis (357) through the composite elongate member (302) and about 90 degrees with respect to the axis (357) through the composite elongate member (302).

9. The apparatus of claim 7, wherein a group (2218) in the groups (2214) of the layers (2204) comprises at least two layers and wherein a layer in the group (2218) in the groups (2214) of the layers (2204) comprises fibers arranged at an angle selected from one of a first angle of about zero degrees with respect to an axis (357) through the composite elongate member (302) and a second angle between a range from about 45 degrees to about 50 degrees with respect to the axis (357) through the composite elongate member (302).

10. The apparatus of claim 7, wherein a layer in a group (2218) in the groups (2214) of the layers (2204) does not have fibers arranged at an angle of about 90 degrees with respect to an axis (357) through the composite elongate member (302).

11. The apparatus of claim 1, wherein the composite elongate member (302) comprises:
   a first section (320); and
   a second section (322) positioned substantially perpendicular to the first section (320), wherein the second section (322) meets the first section (320) at a first location (321) of the second section (322) having a first curved shape (324) with a first radius (326) and a second location (323) of the second section (322) having a second curved shape (328) with a second radius (330) in which the first radius (326) and the second radius (330) are substantially equal, and wherein the first section (320) and the second section (322) are positioned with respect to each other to form the channel (332) between the first location (321) and the second location (323).

12. The apparatus of claim 1, wherein the composite elongate member (302) is selected from one of a stringer and a stiffener.

13. The apparatus of claim 1, wherein the structure (306) is selected from one of a skin panel, a spar, a rib, and a base charge.

14. The apparatus of claim 1, wherein the composite elongate member (302) is a stringer, a side of the stringer is a first side (334), the structure (306) is a skin panel attached to the first side (334) of the stringer, and a rib is attached to a second side (331) of the stringer that is substantially opposite to the first side (334).

15. A structural system (300) for an aircraft (301) comprising:
   a composite elongate member (302) having a base section and a vertical section in which the vertical section extends away from the base section in a direction substantially perpendicular to the base section to form a T-shape (317), wherein the vertical section meets the base section at a first location (321) of the vertical section and a second location (323) of the vertical section in which the first location (321) has a first curved shape (324) and the second location (323) has a second curved shape (328) in which the first curved shape (324) and the second curved shape (328) have a substantially same radius; wherein a channel (332) is formed between the first location (321) and the second location (323) and extends along a length of the composite elongate member (302); and wherein the composite elongate member (302) has a first Young's modulus; and
   a filler structure (336) comprising a number of composite structures (304) configured to substantially conform to a shape (316) of the channel (332) and wherein the number of composite structures (304) has a second Young's modulus that is within a desired range from the first Young's modulus and wherein a composite structure (306) in the number of composite structures (304) comprises layers (2204) having different orientations (2210) selected to increase a capacity (356) of the composite elongate member (302) to withstand forces (358) that pull the composite elongate member (302) away from the base section, the number of composite structures comprising a top segment configured to contact an apical portion of the channel.

16. The structural system (300) of claim 15, wherein the composite elongate member (302) has a first coefficient of thermal expansion and the filler structure (336) has a second coefficient of thermal expansion that is substantially equal to the first coefficient of thermal expansion.

17. A method for increasing a pull-off capacity (356) for a composite elongate member (302), the method comprising:
   operating an aircraft (301); and
   generating forces (358) configured to pull the composite elongate member (302) away from a structure (306) attached to a side of the composite elongate member (302) during operation of the aircraft (301), wherein a channel (332) extends along a length of the composite elongate member (302) on the side of the composite elongate member (302) attached to the structure (306) and a number of composite structures (304) in the channel (332) in which a composite structure (306) in the number of composite structures (304) comprises layers (2204) having different orientations (2210) selected such that a capacity (356) of the composite elongate member (302) to withstand the forces (358) that pull the composite elongate member (302) away from the structure (306) is increased, the number of composite structures comprising a top segment configured to contact an apical portion of the channel.

18. The method of claim 17, wherein operating the aircraft (301) comprises:
   operating the aircraft (301) such that pressure is applied to the composite elongate member (302) and the structure (306) attached to the side of the composite elongate member (302), wherein the pressure causes the forces (358) to be generated.

19. The method of claim 18, wherein the forces (358) are in a direction substantially perpendicular to a surface (337) of the structure (306).

20. The method of claim 17, wherein generating the forces (358) configured to pull the composite elongate member (302) away from the structure (306) in response to the operation of the aircraft (301) comprises:
   generating the forces (358) configured to pull the composite elongate member (302) away from the structure (306) during the operation of the aircraft (301) such that a tensile load is created at a location where the composite elongate member (302) is attached to the structure (306).

\* \* \* \* \*